(12) United States Patent
Lebens et al.

(10) Patent No.: US 8,829,808 B1
(45) Date of Patent: Sep. 9, 2014

(54) APPARATUS AND METHOD FOR PULSED L.E.D. ILLUMINATION

(71) Applicant: LED Tech Development LLC, Tyler, TX (US)

(72) Inventors: Gary A. Lebens, Chaska, MN (US); Charles T. Bourn, Minnetonka, MN (US); Charles A. Lemaire, Apple Valley, MN (US)

(73) Assignee: LED Tech Development, LLC, Burnsville, MN (US)

( * ) Notice: Subject to any disclaimer, the term of this patent is extended or adjusted under 35 U.S.C. 154(b) by 0 days.

(21) Appl. No.: 14/049,188

(22) Filed: Oct. 8, 2013

Related U.S. Application Data

(60) Division of application No. 13/736,865, filed on Jan. 8, 2013, now Pat. No. 8,643,305, which is a division of application No. 13/244,481, filed on Sep. 25, 2011, now Pat. No. 8,362,712, which is a division of application No. 12/820,139, filed on Jun. 22, 2010, now Pat. No. 8,159,146, which is a division of application No. 12/166,315, filed on Jul. 1, 2008, now Pat. No. 7,740,371, which is a division of application No. 11/674,143, filed on Feb. 12, 2007, now Pat. No. 7,393,119, which is a division of application No. 10/945,801, filed on Sep. 20, 2004, now Pat. No. 7,186,000, which is a division of application No. 10/299,609, filed on Nov. 18, 2002, now Pat. No. 6,808,287, which is a continuation of application No. 09/978,760, filed on Oct. 16, 2001, now Pat. No. 6,488,390, which is a continuation of application No. 09/627,268, filed on Jul. 28, 2000, now Pat. No. 6,305,818, which is a division of application No. 09/044,559, filed on Mar. 19, 1998, now Pat. No. 6,095,661.

(51) Int. Cl.
*H05B 37/02* (2006.01)
*H05B 33/08* (2006.01)

(52) U.S. Cl.
CPC ........ *H05B 33/0863* (2013.01); *H05B 33/0869* (2013.01)
USPC .......................................... 315/291; 315/307

(58) Field of Classification Search
USPC ............. 315/152–159, 209 R, 225, 226, 291, 315/307, 308, 362
See application file for complete search history.

(56) References Cited

U.S. PATENT DOCUMENTS

| 1,445,245 A | 2/1923 | Staples |
| 3,001,185 A | 9/1961 | Cleek |

(Continued)

OTHER PUBLICATIONS

Abbas, Daniel C., "0.5-MHz bandwidth, voltage-programmable current source for light-emitting-diode testing", "Rev. Sci. Instrum.", Jan. 1981, pp. 123-126, vol. 52, No. 1.

(Continued)

*Primary Examiner* — Jimmy Vu
(74) *Attorney, Agent, or Firm* — Eduardo E. Drake; Fantastic IP Consulting, LLC; Charles A. Lemaire

(57) ABSTRACT

An illumination source for a camera includes one or more LEDs, and an electrical circuit that selectively applies power from the DC voltage source to the LEDs, wherein the illumination source is suitable for handheld portable operation. In some embodiments, the electrical circuit further includes a control circuit for driving the LEDs with electrical pulses at a frequency high enough that light produced has an appearance to a human user of being continuous rather than pulsed, the control circuit changing a pulse characteristic to adjust a proportion of light output having the first characteristic color spectrum output to that having the second characteristic color spectrum output. Some embodiments provide an illumination source including a housing including one or more LEDs and a control circuit that selectively applies power from a source of electric power to the LEDs, thus controlling a light output color spectrum of the LEDs.

25 Claims, 11 Drawing Sheets

(56) References Cited

U.S. PATENT DOCUMENTS

| | | | |
|---|---|---|---|
| 3,617,859 A | 11/1971 | Dobkin et al. | |
| 3,663,752 A | 5/1972 | Froschle | |
| 3,693,060 A | 9/1972 | Joyce | |
| 3,902,806 A | 9/1975 | Bober | |
| 4,068,148 A | 1/1978 | Nomiya et al. | |
| 4,139,348 A | 2/1979 | Swartz | |
| 4,208,579 A | 6/1980 | Scrivo et al. | |
| 4,212,073 A | 7/1980 | Balasubramanian | |
| 4,290,095 A | 9/1981 | Schmidt | |
| 4,346,329 A | 8/1982 | Schmidt | |
| 4,347,499 A | 8/1982 | Burkman, Sr. et al. | |
| 4,403,157 A | 9/1983 | Guajardo et al. | |
| 4,447,150 A | 5/1984 | Heinemann | |
| 4,499,525 A | 2/1985 | Mallory | |
| 4,509,266 A | 4/1985 | Cusack | |
| 4,514,727 A | 4/1985 | Van Antwerp | |
| 4,592,147 A | 6/1986 | Herman | |
| 4,626,765 A | 12/1986 | Tanaka | |
| 4,639,139 A | 1/1987 | Wyant et al. | |
| 4,641,972 A | 2/1987 | Halioua et al. | |
| 4,644,342 A | 2/1987 | Abbas | |
| 4,698,730 A | 10/1987 | Sakai et al. | |
| 4,743,773 A | 5/1988 | Katana et al. | |
| 4,748,350 A | 5/1988 | Emori | |
| 4,820,229 A | 4/1989 | Spraggins | |
| 4,820,299 A | 4/1989 | Philippe et al. | |
| 4,831,504 A | 5/1989 | Nishizawa et al. | |
| 4,845,481 A | 7/1989 | Havel | |
| 4,877,326 A | 10/1989 | Chadwick et al. | |
| 4,882,498 A | 11/1989 | Cochran et al. | |
| 4,893,815 A | 1/1990 | Rowan | |
| 4,914,289 A | 4/1990 | Nguyen et al. | |
| 4,962,347 A | 10/1990 | Burroughs et al. | |
| 4,964,023 A | 10/1990 | Nishizawa et al. | |
| 4,965,665 A | 10/1990 | Amir | |
| 4,967,284 A | 10/1990 | Yoshida et al. | |
| 4,972,093 A | 11/1990 | Cochran et al. | |
| 4,974,138 A | 11/1990 | Negishi | |
| 4,978,857 A | 12/1990 | Juengel | |
| 4,992,704 A | 2/1991 | Stinson | |
| 5,008,788 A | 4/1991 | Palinkas | |
| 5,010,412 A | 4/1991 | Garriss | |
| 5,015,918 A | 5/1991 | Copeland | |
| 5,051,825 A | 9/1991 | Cochran et al. | |
| 5,058,982 A | 10/1991 | Katzir | |
| 5,059,013 A | 10/1991 | Jain | |
| 5,060,065 A | 10/1991 | Wasserman | |
| 5,065,035 A | 11/1991 | Juengel | |
| 5,072,127 A | 12/1991 | Cochran et al. | |
| 5,085,502 A | 2/1992 | Womack et al. | |
| 5,099,139 A | 3/1992 | Nishimura | |
| 5,172,005 A | 12/1992 | Cochran et al. | |
| 5,179,335 A | 1/1993 | Nor | |
| 5,179,474 A | 1/1993 | Bailey et al. | |
| 5,279,513 A | 1/1994 | Connelly | |
| 5,299,227 A | 3/1994 | Rose | |
| 5,354,977 A | 10/1994 | Roustaei | |
| 5,355,221 A | 10/1994 | Cohen et al. | |
| 5,398,113 A | 3/1995 | de Groot | |
| 5,424,927 A | 6/1995 | Schaller et al. | |
| 5,457,492 A | 10/1995 | Sasaki et al. | |
| 5,465,152 A | 11/1995 | Bilodeau et al. | |
| 5,468,950 A | 11/1995 | Hanson | |
| 5,471,052 A * | 11/1995 | Ryczek | 250/226 |
| 5,546,189 A | 8/1996 | Svetkoff et al. | |
| 5,561,525 A | 10/1996 | Toyonaga et al. | |
| 5,563,703 A | 10/1996 | Lebeau et al. | |
| 5,574,801 A | 11/1996 | Coolet-Beillon | |
| 5,604,550 A | 2/1997 | White | |
| 5,636,025 A | 6/1997 | Bieman et al. | |
| 5,646,733 A | 7/1997 | Bieman | |
| 5,680,215 A | 10/1997 | Huber et al. | |
| 5,745,176 A | 4/1998 | Lebens | |
| 5,767,659 A | 6/1998 | Farley | |
| 5,783,909 A | 7/1998 | Hochstein | |
| 5,815,018 A | 9/1998 | Soborski | |
| 5,825,495 A | 10/1998 | Huber | |
| 5,828,449 A | 10/1998 | King et al. | |
| 5,838,247 A | 11/1998 | Bladowski | |
| 5,859,924 A | 1/1999 | Liu et al. | |
| 5,890,794 A | 4/1999 | Abtahi et al. | |
| 5,912,568 A | 6/1999 | Kiley | |
| 6,016,038 A * | 1/2000 | Mueller et al. | 315/291 |

OTHER PUBLICATIONS

Bains, Sunny, "Advance Said to Hold Promise for Wavelength-division Multiplexing—Device Steers White Light Through Wide Angles", "EE Times, Section: Technology", May 10, 1999, pp. 1-5, vol. 1060.

Bains, Sunny, "Device Steers White Light Through Wide Angles", "EE Times", 1999, pp. 57-58.

Boulder Nonlinear Systems, Inc., "Boulder Nonlinear Systems, Inc. ", "http://www.bnonlinear.com/VLSI%20Beam.htm", Last Mod. Jun. 15, 2000, pp. 1-4.

Chung, Jeremy K., et al., "A high-performance LED array driver ASIC with programmable thermal coefficients", "ASIC Conference and Exhibit, 1991. Proceedings., Fourth Annual IEEE International, Sep. 23, 1991-Sep. 27, 1991, Rochester, NY", 1991, pp. P5-4.1-P5-4.2.

Deforges, J, et al., "Light source with light emitting diodes. Determination of limited frequencies and of the crest factor of illuminance met", "J. Optics (Paris)", 1989, pp. 205-217, vol. 20, No. 5.

Eagar, et al., "Applications of the LT1300 and LT1301 Micropower DC/DC Converters", "downloaded from: http://cds.linear.com/docs/en/application-note/an59.pdf", 1994, Publisher: Linear Technology—Application Note 59.

Edmund Scientific Company, "Edmund Scientific Company catalog p. 47", "Edmund Scientific Company 1993 Annual Referencing Catalog, Cylinder Lenses (CYL) ", 1993, Page(s) catalog p. 47.

"Hewlett Packard Optotronics Designer's Catalog, Technical Data entitled High power AlInGaIP Amber and Reddish-Orange Lam", "Hewlett Packard Optotronics Designer's Catalog", 1993, pp. 3-24 thru 3-29.

"USPTO Patent Trial and Appeal Board Case IPR2013-00610—Petition for Inter Partes Review of U.S. Patent No. 6,095,661 (uploaded file name: NPL-00610-1-power of attorney-1.pdf)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1005.pdf) (= NPL Eager, et al. 1994)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1006.pdf) (= U.S. Patent 5010412 to Garriss)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1007.pdf) (= U.S. Patent 5783909 to Hochstein)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1008.pdf) (= U.S. Patent 4499525 to Mallory)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1009.pdf) (= U.S. Patent 4698730 to Sakai et al.)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1010.pdf) (= Declaration of Reimund)", Sep. 23, 2013.

"USPTO Patent Trial and Appeal Board Case IPR2013-00610—Petition for Inter Partes Review of U.S. Patent No. 6,095,661 (uploaded file name: NPL-00610-Exhibit-1011.pdf) (= U.S. Patent 5424927 to Schaller et al.)", Sep. 23, 2013.

"USPTO Patent Trial and Appeal Board Case IPR2013-00610—Petition for Inter Partes Review of U.S. Patent No. 6,095,661

(56) References Cited

OTHER PUBLICATIONS (uploaded file name: NPL-00610-Exhibit-1012.pdf) (= NPL Schauler et al. 1997)", Sep. 23, 2013.
"USPTO Patent Trial and Appeal Board Case IPR2013-00610—Petition for Inter Partes Review of U.S. Patent No. 6,095,661 (uploaded file name: NPL-00610-Exhibit-1013.pdf) (= Curriculum vitae of Horenstein)", Sep. 23, 2013.
, "USPTO Patent Trial and Appeal Board Case IPR2013-00610—Petition for Inter Partes Review of U.S. Patent No. 6,095,661 (uploaded file name: NPL-00610-IPR2013-00610_6095661_Table-of-contents.pdf) (= screenshot of file of USPTO Case IPR2013-00610)", Sep. 23, 2013.
"USPTO Patent Trial and Appeal Board Case IPR2013-00610—Petition for Inter Partes Review of U.S. Patent No. 6,095,661 (uploaded file name: NPL-00610-2-power of attorney-2.pdf)", Sep. 23, 2013.
"USPTO Patent Trial and Appeal Board Case IPR2013-00610—Petition for Inter Partes Review of U.S. Patent No. 6,095,661 (uploaded file name: NPL-00610-3-power of attorney-3.pdf)", Sep. 23, 2013.
"USPTO Patent Trial and Appeal Board Case IPR2013-00610—Petition for Inter Partes Review of U.S. Patent No. 6,095,661 (uploaded file name: NPL-00610-4-petition-4.pdf)", Sep. 23, 2013.
"USPTO Patent Trial and Appeal Board Case IPR2013-00610—Petition for Inter Partes Review of U.S. Patent No. 6,095,661 (uploaded file name: NPL-00610-5-notice-5.pdf) (= USPTO Notice re Case IPR2013-00610)", Sep. 26, 2013.
"USPTO Patent Trial and Appeal Board Case IPR2013-00610—Petition for Inter Partes Review of U.S. Patent No. 6,095,661 (uploaded file name: NPL-00610-Exhibit-1001.pdf) (= U.S. Patent 6095661 to Lebens et al.)", Sep. 23, 2013.
"USPTO Patent Trial and Appeal Board Case IPR2013-00610—Petition for Inter Partes Review of U.S. Patent No. 6,095,661 (uploaded file name: NPL-00610-Exhibit-1002.pdf) (= U.S. Patent 6095661 USPTO file history)", Sep. 23, 2013.
"USPTO Patent Trial and Appeal Board Case IPR2013-00610—Petition for Inter Partes Review of U.S. Patent No. 6,095,661 (uploaded file name: NPL-00610-Exhibit-1003.pdf) (= Declaration of Horenstein)", Sep. 23, 2013.
"USPTO Patent Trial and Appeal Board Case IPR2013-00610—Petition for Inter Partes Review of U.S. Patent No. 6,095,661 (uploaded file name: NPL-00610-Exibit-1004.pdf) (= U.S. Patent 4514727 to Van Antwerp)", Sep. 23, 2013.
"USPTO Patent Trial and Appeal Board Case IPR2013-00611—Petition for Inter Partes Review of U.S. Patent No. 6,488,390 (uploaded file name: NPL-00611-1-power of attorney-1.pdf)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1005.pdf) (= U.S. Patent 5010412 to Garriss)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1006.pdf) (= U.S. Patent 4499525 to Mallory)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1007.pdf) (= U.S. Patent 5783909 to Hochstein)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1008.pdf) (= Curriculum vitae of Horenstein)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1009.pdf) (= NPL of Schauler et al. 1997)", Sep. 23, 2013.
"USPTO Patent Trial and Appeal Board Case IPR2013-00611—Petition for Inter Partes Review of U.S. Patent No. 6,488,390 (uploaded file name: NPL-00611-IPR2013-00611_6488390_Table-of-contents.pdf) (= screenshot of file of USPTO Case IPR2013-00611)", Sep. 23, 2013.
"USPTO Patent Trial and Appeal Board Case IPR2013-00611—Petition for Inter Partes Review of U.S. Patent No. 6,488,390 (uploaded file name: NPL-00611-1-power of attorney-2.pdf)", Sep. 23, 2013.
"USPTO Patent Trial and Appeal Board Case IPR2013-00611—Petition for Inter Partes Review of U.S. Patent No. 6,488,390 (uploaded file name: NPL-00611-1-power of attorney-3.pdf)", Sep. 23, 2013.
"USPTO Patent Trial and Appeal Board Case IPR2013-00611—Petition for Inter Partes Review of U.S. Patent No. 6,488,390 (uploaded file name: NPL-00611-4-petition-4.pdf)", Sep. 23, 2013.
"USPTO Patent Trial and Appeal Board Case IPR2013-00611—Petition for Inter Partes Review of U.S. Patent No. 6,488,390 (uploaded file name: NPL-00611-5-notice-5.pdf) (= USPTO Notice re Case IPR2013-00611)", Sep. 26, 2013.
"USPTO Patent Trial and Appeal Board Case IPR2013-00611—Petition for Inter Partes Review of U.S. Patent No. 6,488,390 (uploaded file name: NPL-00611-Exhibit-1001.pdf) (= U.S. Patent 6488390 to Lebens et al.)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1002.pdf) (= USPTO file history Patent 6488390)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1003.pdf) (= Declaration of Horenstein)", Sep. 23, 2013.
"USPTO Patent Trial and Appeal Board Case IPR2013-00611—Petition for Inter Partes Review of U.S. Patent No. 6,488,390 (uploaded file name: NPL-00611-Exhibit-1004.pdf) (= U.S. Patent 4514727 to Van Antwerp)", Sep. 23, 2013.
Kobayashi, M., et al., "Wide-band suppression of photon-number fluctuations in a high-speed light-emitting diode driven by a constant-current so", "Appl. Phys. Lett.,", Jan 19, 1998, pp. 284-286, vol. 72, No. 3.
Schauler, M., et al., "GaN based LED's with different recombination zones", "MRS Internet J. Nitride Semicond. Res.", 1997, p. 44 No. 2.
Schubert, E.F., et al., "15000 hrs stable operation of resonant cavity light emitting diodes ", "Applied Physics A (Materials Science Processing),", 1998, pp. 319-321, vol. A66, No. 3.
Sumitomo, H., et al. , "Wideband and deep penetration of photon-number fluctuations into quantum regime in series-connected light-emitting diode", "International Quantum Electronics Conference. Technical Digest Series, vol. 7 (IEEE Cat. No. 98CH36236)", 1998, pp. 169-170, vol. 7.
Wada, O., et al. , "Monolithic integration of an AlGaAs/GaAs DH LED with a GaAs FET driver", "IEEE Electron Device Letters", 1982, vol. EDL-3, No. 10.
Wada, N., et al., "Stable operation of AlGaAs/GaAs light-emitting diodes fabricated on Si substrate", "Jpn. J. Appl. Phys.", Feb. 1992, pp. L78-L81, vol. 31.
"USPTO Patent Trial and Appeal Board Case IPR2013-00610 (Patent 6,095,661) Institution Decision, of Mar. 7, 2014" pp. 40 pages.
"USPTO Patent Trial and Appeal Board Case IPR2013-00610 (Patent 6,095,661) Patent owners motion and request for Adverse Judgment, of Apr. 16, 2014" pp. 7 pages.
"USPTO Patent Trial and Appeal Board Cases IPR2013-00610 (Patent 6,095,661) and IPR2013-00611 (Patent 6,488,390) Order (conduct of the proceeding), of Apr. 14, 2014" pp. 3 pages.
"USPTO Patent Trial and Appeal Board Case IPR2013-00610 (Patent 6,095,661) Final Judgment, of Apr. 29, 2014" pp. 3 pages.
"USPTO Patent Trial and Appeal Board Case IPR2013-00611 (Patent 6,488,390) Institution Decision, of Mar. 7, 2014" pp. 34 pages.
"USPTO Patent Trial and Appeal Board Case IPR2013-00611 (Patent 6,488,390) Patent owners motion and request for Adverse Judgment, of Apr. 16, 2014" pp. 7 pages.
"USPTO Patent Trial and Appeal Board Case IPR2013-00611 (Patent 6,488,390) Final Judgment, of Apr. 29, 2014" pp. 3 pages.

(56) References Cited

OTHER PUBLICATIONS

"USPTO Patent Trial and Appeal Board Case IPR2014-00590 (Patent 6,095,661) Petition for inter partes review of United States Patent No. 6,095,661, of Apr. 7, 2014" pp. 67 pages.

"USPTO Patent Trial and Appeal Board Case IPR2014-00590 (Patent 6,095,661) Exhibit: Dr. Mark Horenstein declaration, of Apr. 7, 2014".

"USPTO Patent Trial and Appeal Board Case IPR2014-00590 (Patent 6,095,661) Petitioners motion for joinder, of Apr. 7, 2014" p. 7 pages.

"USPTO Patent Trial and Appeal Board Case IPR2014-00590 (Patent 6,095,661) Notice of filed accorded to petition, of Apr. 23, 2014" pp. 4 pages.

"USPTO Patent Trial and Appeal Board Case IPR2014-00590 (Patent 6,095,661) Corrected petition for inter partes review of United States Patent No. 6,095,661, of Apr. 30, 2014" pp. 66 pages.

"USPTO Patent Trial and Appeal Board Case IPR2014-00590 (Patent 6,095,661) Patent owners opposition to motion for joinder, of May 6, 2014" pp. 13 pages.

Texas Instruments, "Texas Instruments data sheet for LM317 (3-terminal adjustable regulator)", "downloaded May 6, 2014 from internet address: http://www.ti.com/lit/ds/symlink/lm317.pdf", Sep. 1997, pp. 26 pages.

\* cited by examiner

APPARATUS AND METHOD FOR PULSED L.E.D. ILLUMINATION

CROSS-REFERENCE TO RELATED APPLICATIONS

This application is a divisional application of U.S. patent application Ser. No. 13/736,865 filed Jan. 8, 2013, (which issued as U.S. Pat. No. 8,643,305 on Feb. 4, 2014), which is a divisional application of U.S. patent application Ser. No. 13/244,481 filed Sep. 25, 2011 (which issued as U.S. Pat. No. 8,362,712 on Jan. 29, 2013); which is a divisional application of U.S. patent application Ser. No. 12/820,139 filed Jun. 22, 2010, (which issued as U.S. Pat. No. 8,159,146 on Apr. 17, 2012); which is a divisional application of U.S. patent application Ser. No. 12/166,315 filed Jul. 1, 2008 (which issued as U.S. Pat. No. 7,740,371 on Jun. 22, 2010); which was a divisional of U.S. patent application Ser. No. 11/674,143 filed Feb. 12, 2007 (now U.S. Pat. No. 7,393,119); which was a divisional of U.S. patent application Ser. No. 10/945,801 filed Sep. 20, 2004 (now U.S. Pat. No. 7,186,000); which was a divisional of U.S. patent application Ser. No. 10/299,609 filed Nov. 18, 2002 (now U.S. Pat. No. 6,808,287); which was a continuation of U.S. patent application Ser. No. 09/978,760 filed Oct. 16, 2001 (now U.S. Pat. No. 6,488,390); which was a continuation of U.S. patent application Ser. No. 09/627,268 filed Jul. 28, 2000 (now U.S. Pat. No. 6,305,818); which was a divisional of U.S. patent application Ser. No. 09/044,559 filed Mar. 19, 1998 (now U.S. Pat. No. 6,095,661); each of which applications is incorporated herein in its entirety by reference.

FIELD OF THE INVENTION

This invention relates to the field of lighting, and more specifically to a method and apparatus of controlling and powering a solid-state light source such as a light-emitting diode or LED, for a portable battery-powered flashlight.

BACKGROUND OF THE INVENTION

There is a widespread need for hand-held flashlights and lanterns. One common flashlight includes a two-cell battery for power, an incandescent lamp to emit light, and a simple single-pole switch to connect and disconnect the battery to the lamp. Other flashlights use other numbers of battery cells in order to provide a voltage suitable for various particular conditions. Lanterns often use a fluorescent tube to emit light. Certain keychain fobs use a pair of hearing-aid cells and a red-light light-emitting diode (LED) in order to provide short-range lighting such as might be needed to find a keyhole in the dark.

Battery technology is such that as electrical power is withdrawn from a battery cell, the voltage available across a given current load will decrease. This decreased available voltage across the given load causes reduced light output, gradually dimming the light as the battery charge depletes.

Further, LEDs have voltage, current, and power parameters that must be controlled in order to maximize device life. Commonly, a current-limiting resistor is placed in series with an LED in order that only a portion of the voltage drop from the battery is across the LED and the rest of the voltage drop is across the resistor. This voltage drop and corresponding power loss in the resistor is dissipated as waste heat, which is inefficient for a flashlight which should be designed to emit light.

In addition, it is awkward or difficult to determine the amount of remaining charge in a battery cell, generally requiring removal of the battery from the flashlight in order to measure the remaining charge. In addition, the cost of a separate measurement device can be a negative for this market. Some battery cells today include a built-in liquid-crystal indicator for the charge in the cell, but such a solution requires a separate measurement device/indicator for each battery, and requires removal of the battery from the flashlight in order to perform the measurement and observe the indication of remaining power.

BRIEF SUMMARY OF THE INVENTION

Some embodiments provide a method of providing changeable illumination of such compact size and low weight as to be suitable for single-handed portable operation by a user. The method includes providing one or more LEDs having a first characteristic color spectrum output and one or more LEDs having a second characteristic color spectrum output, wherein the first characteristic color spectrum output is different from the second characteristic color spectrum output, selectively applying pulsed power from a DC voltage source to the LEDs, wherein the pulses are of high-enough frequency such that the human eye does not perceive the pulses, and changing a pulse characteristic of the pulsed power in order to change a proportion of light output having the first characteristic color spectrum output to that having the second characteristic color spectrum output.

Some embodiments provide a portable pulsed LED illumination source of such compact size and low weight as to be suitable for single-handed portable operation by a user. The source include one or more LEDs having a first characteristic color spectrum output, one or more LEDs having a second characteristic color spectrum output, wherein the first characteristic color spectrum output different from the second characteristic color spectrum output, and a control circuit that controls a pulse characteristic to the one or more LEDs having a first characteristic color spectrum output in order to change a proportion of light output having the first characteristic color spectrum output to that having the second characteristic color spectrum output.

The present invention provides a method and apparatus for an L.E.D. flashlight or other LED illumination source. In one embodiment, a flashlight is described. The flashlight includes a flashlight housing suitable for receiving therein and/or mounting thereon at least one DC voltage source such as a battery. The flashlight also includes a light-emitting diode (LED) housing connected to the flashlight housing, the LED housing including a first plurality of LED units that each emit light and have a reflector for collimating the emitted light forwardly therefrom generally along an LED optical axis, the first plurality of LED units including at least seven individual LED units. The flashlight also includes a first electrical circuit that selectively applies power from the DC voltage source to the LED units, wherein the flashlight is of such compact size and low weight as to be suitable for single handed portable operation by a user, the flashlight further having a purpose of providing general-purpose illumination.

In one embodiment, the LED optical axes of the first plurality of LED units in the flashlight are substantially parallel to one another. In one such embodiment, the flashlight further includes a second plurality of LED units that each emit light and have a reflector for collimating the emitted light forwardly therefrom generally along an LED optical axis, wherein the LED optical axes of the second plurality of LED units converge or diverge from one another forwardly from the housing.

In another embodiment, an optical spread angle of the first plurality of LED units in the flashlight are substantially equal to one another. In one such embodiment, the flashlight further includes a second plurality of LED units that each emit light and have a reflector for collimating the emitted light forwardly therefrom generally along an LED optical axis, wherein an optical spread angle of the second plurality of LED units are substantially equal to one another, and different than the optical spread angle of the first plurality of LED units.

In yet another embodiment, the LED units are connected in a parallel-series configuration with at least two LED units coupled in parallel to one another and in series with at least one other LED unit, and the DC voltage source includes at least three battery cells connected in series.

In still another embodiment, the first electrical circuit further includes a control circuit for maintaining a predetermined light output level of the LED units as a charge on the battery cell varies. In one such embodiment, the control circuit maintains an average predetermined light output level of the LED units as the charge on the battery cell varies by increasing a pulse width or a pulse frequency as the charge on the battery cell decreases. In another such embodiment, the control circuit maintains an average predetermined light output level of the LED units by measuring a battery voltage and adjusting a pulse width or a pulse frequency or both to maintain the average light output at the predetermined level. In still another such embodiment, the control circuit maintains an average predetermined light output level of the LED units by measuring an average light output and adjusting a pulse width or a pulse frequency or both to maintain the measured average light output at the predetermined level.

Another aspect of the present invention provides a flashlight including: (a) a flashlight housing, the housing being suitable for at least one of receiving therein and mounting thereon at least one DC voltage source that includes at least one battery cell; (b) a light-emitting diode (LED) housing connected to the flashlight housing, the LED housing including one or more first LED units that each emit light and have a reflector for collimating the emitted light forwardly therefrom generally along an LED optical axis; and (c) a first electrical circuit that selectively applies power from the DC voltage source to the LED units, the first electrical circuit further including a control circuit for maintaining a predetermined light output level of the LED units as a charge on the battery cell varies; wherein the flashlight is of such compact size and low weight as to be suitable for single handed portable operation by a user, the flashlight further having a purpose of providing general-purpose illumination.

In one such embodiment, the first LED units being a first plurality of LED units, wherein the LED optical axes of the first plurality of LED units are substantially parallel to one another. In another such embodiment, the flashlight further includes a second plurality of LED units that each emit light and have a reflector for collimating the emitted light forwardly therefrom generally along an LED optical axis, wherein the LED optical axes of the second plurality of LED units converge or diverge from one another forwardly from the housing.

In another such embodiment, the first LED units are a first plurality of LED units, wherein an optical spread angle of the first plurality of LED units are substantially equal to one another. In yet another such embodiment, the flashlight further includes a second plurality of LED units that each emit light and have a reflector for collimating the emitted light forwardly therefrom generally along an LED optical axis, wherein an optical spread angle of the second plurality of LED units are substantially equal to one another, and different than the optical spread angle of the first plurality of LED units.

Another aspect of the present invention provides a method of providing general-purpose illumination of such compact size and low weight as to be suitable for single handed portable operation by a user, including the steps of: (a) providing one or more first LED units that each emit light and have a reflector for collimating the emitted light forwardly therefrom generally along an LED optical axis; (b) selectively applying power from a DC voltage source to the LED units; and (c) maintaining a predetermined light output level of the LED units as a charge on the battery cell varies by controlling the step (b).

In one embodiment, the step of maintaining maintains an average predetermined light output level of the LED units as the charge on the battery cell varies by increasing a pulse energy or a pulse frequency as the charge on the battery cell decreases. In another embodiment, the step of maintaining maintains an average predetermined light output level of the LED units by measuring a battery voltage and adjusting a pulse width or a pulse frequency or both to maintain the average light output at the predetermined level. In still another embodiment, the step of maintaining maintains an average predetermined light output level of the LED units by measuring a light output and adjusting a pulse energy or a pulse frequency or both to maintain an average light output at the predetermined level.

Yet another aspect of the present invention provides an illumination source, that includes (a) a light-emitting diode (LED) housing including one or more LEDs; and (b) a control circuit that selectively applies power from a source of electric power to the LEDs, the control circuit substantially maintaining a light output characteristic of the LEDs as a voltage of the voltage source varies over a range that would otherwise vary the light output characteristic. In one such embodiment, the light output characteristic that is maintained is light output intensity. In another such embodiment, the control circuit maintains the light output intensity of the LED units as the voltage of the DC voltage source varies by increasing a pulse width, a pulse energy, or a pulse frequency as the voltage of the DC voltage source decreases. In another such embodiment, the control circuit maintains an average predetermined light output level of the LED units by measuring a voltage and adjusting a pulse energy or a pulse frequency or both to maintain the average light output at the predetermined level. In yet another such embodiment, the control circuit maintains an average predetermined light output level of the LED units by measuring an average light output and adjusting a pulse width or a pulse frequency or both to maintain the measured average light output at the predetermined level.

Another aspect of the present invention provides a battery-powered portable flashlight (100) including: a casing (110) suitable to hold a battery; one or more light-emitting devices (LEDs) (150) mounted to the casing; a switch (140) mounted to the casing; and a control circuit (130) coupled to the battery, the LEDs, and the switch, wherein the control circuit drives the LEDs with electrical pulses at a frequency high enough that light produced by the LEDs has an appearance to a human user of being continuous rather than pulsed, and wherein the LEDs have proportion of on-time that increases as remaining battery power decreases. One such embodiment further includes a feedback circuit that controls the pulses so that light intensity produced by the LEDs, as perceived by the human user, is substantially constant across a greater range of battery power or voltage than a corresponding range for which light intensity is equally constant without the feedback circuit. In one such embodiment, the feedback circuit measures a light output of the LEDs. Another such embodiment further includes a battery-voltage-measuring circuit coupled to the control circuit.

Yet another aspect of the present invention provides a method for driving battery-powered portable flashlight (100) having a casing (110), a DC power source mounted to the casing, one or more solid-state light-emitting device (LEDs) (150) mounted to the casing, the method including the steps of: receiving input from a user; and based on the received input, generating a series of pulses to drive the LEDs such that the LEDs have proportion of on-time that increases as remaining battery power decreases.

Still another aspect of the present invention provides an illumination source including (a) a light-emitting diode (LED) housing including one or more LEDs; and (b) a control circuit that selectively applies power from a source of electric power to the one or more LEDs, the control circuit maintaining a predetermined light output color spectrum of the one or more LEDs as a voltage of the source of electric power varies. In one such embodiment, the one or more LEDs comprise one or more LEDs having a first characteristic color spectrum output and one or more LEDs having a second characteristic color spectrum output, the first characteristic color spectrum output different from the second characteristic color spectrum output, and the control circuit controls a pulse characteristic in order to control the proportion of light output having the first characteristic color spectrum output to that having the second characteristic color spectrum output. In another such embodiment, the one or more LEDs comprise one or more LEDs having a characteristic color spectrum output that varies based on applied current, and the control circuit controls a pulse current in order to control the characteristic color spectrum output.

Yet another aspect of the present invention provides an illumination source that includes (a) a light-emitting diode (LED) housing including one or more LEDs; and (b) a control circuit that selectively applies power from a source of electric power to the LEDs to adjust a light output color spectrum of the one or more LEDs.

DETAILED DESCRIPTION OF THE INVENTION

Figure 1:
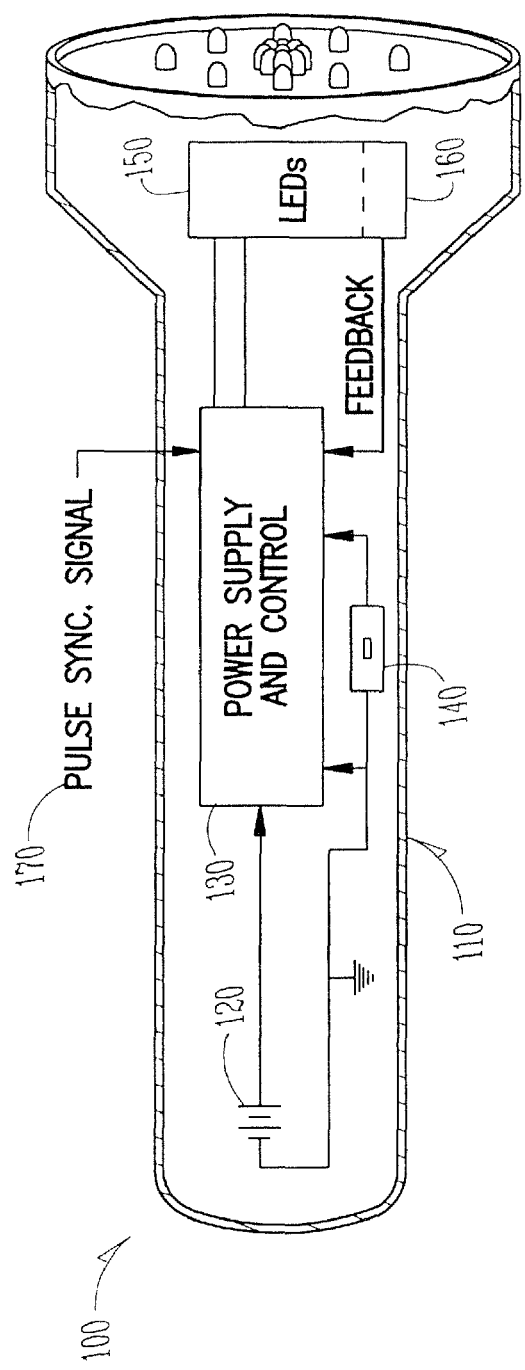
FIG. 1 shows one embodiment of the present invention, a schematic representation of a handheld LED flashlight 100.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The present invention takes advantage of the efficiency of high-intensity, light-emitting diodes (LEDs) in the visible spectrum and/or infra-red (IR) or ultra-violet (UV), arranged in various patterns, the low-voltage properties of CMOS integrated circuits and components, and the efficiency derived from switching the current to and limiting the duration of current to the LEDs to project light efficiently and with constant brightness even as the battery supply voltage decays over time. The invention takes advantage of the dynamic impedance of the LEDs which causes the voltage across the LED to rise rapidly relative to the current flow through the LED to limit the initial current flow to the LED, when battery voltage is highest, to prevent wire bond heating from causing premature failure of the LEDs. The present invention controls the current flow duration (pulse width) to limit power dissipation in the LEDs during the LEDs' on state, and increasing the pulse width as the battery voltage decreases over time to maintain substantially constant perceived or average LED intensity over the course of the battery's life. The invention controls the switching frequency of the pulse width to further control the LED intensity and power dissipation while maintaining a constant light output from the LEDs as perceived or visible to the human eye, or a light-sensing device, e.g., camera, night-vision scope, CMOS and CCD sensor and pixel arrays. The present invention provides a compact, portable light source, preferably sized to be readily hand-held, for illuminating an object, several objects, or areas for human use and/or machine operation. In one embodiment, the invention measures battery voltage and in turn regulates the LED intensity. In another embodiment, the present invention uses a light-sensing device such as a light-sensing transistor or light-detecting diode (LDD) in proximity to the output LED(s) to measure the average brightness and further regulate the LEDs' output.

Another embodiment of the present invention provides operator-selectable control of the pulse frequency and/or the pulse width to provide a reduced apparent brightness in order to increase battery life in situations when maximum brightness is not required. In one such pulse-frequency embodiment, the apparent (visible) pulse frequency would provide a stroboscope effect for safety or entertainment. In this embodiment, the visibly interrupted or pulsed pulse train may include repetitive pulses or a coded sequence as in Morse code "SOS" or a predetermined password or security string of pulses that may then be used as a key or identifier. A further refinement of this embodiment would provide the user with a method for strobing out a message. It is understood that what appears to be a single visible pulse may actually include a high-frequency series of pulses in order to increase the apparent brightness of a single pulse while also protecting the LEDs from excessive power dissipation. In yet another pulse-frequency embodiment of the invention, a variable or adjustable constant sequence pulse train is established for the accurate measurement of the velocity or frequency of an object in motion or vibration.

Another embodiment of the present invention uses various colored LEDs for specialized purposes. In one such embodiment, long-wavelength LEDs, 660 nm or longer, are used to provide underwater divers or aquarium enthusiasts a light source for observing undersea life at night without adversely affecting the nocturnal activities of such wildlife. This functionality is also useful for tropical aquarium owners who also wish to observe the nocturnal activities of the occupants of their aquariums. In another such embodiment, short-wavelength blue LEDs are used with a UV filter to view fluorescing materials, including but not limited to: taggants, stamps, security codes and security seals. As UV LEDs become readily available (such as those announced as made by IBM Corporation in the Mar. 9, 1998 issue of *Electronic Engineering Times*, page 39), these could be used in place of the blue LEDs. In other embodiments, a suitable LED normally emitting in the blue spectrum, for example made from GaN (gallium nitride) or InGaN (indium gallium nitride), is pulsed by pulses of sufficiently high current to blue-shift the output and sufficiently short duration to not destroy the LED in order to maintain a constant light intensity while shifting the color spectrum from blue to ultraviolet. Other embodiments include IR LEDs for military or police use to enhance the usefulness of night-vision equipment and for friend-or-foe identification, multiple color LEDs to produce a white light source, and combinations of colored LEDs to enhance the ability of color-blind individuals to perceive colors. Other uses include LEDs chosen for use in photographic darkrooms wherein the LED wavelength is chosen to prevent undesired exposure of light-sensitive materials.

Another embodiment of the present invention uses LEDs of various "viewing" angles to achieve wide-angle viewing versus narrow-angle, long-range viewing and combinations thereof. A further refinement of this embodiment utilizes a Fresnel lens (or other lens or reflector arrangement) to provide a focusable light source. Another embodiment uses polarizers to reduce specular reflections for enhanced viewing or for use in machine-vision applications. Another embodiment utilizes quickly and easily pluggable/replaceable LED arrays or heads of various shapes, colors, and/or viewing angles for different applications.

In yet another embodiment, the light output is momentarily interrupted repetitively, or strobed, to indicate low battery condition with some estimation of time to battery failure, e.g., the number of pulses could indicate the estimated number of minutes of battery time. As the estimation of time to battery failure changes, the repetition rate is varied to indicate impending battery failure. It is understood that this operational mode is easily distinguished from other operational modes by the duration of on time versus off time. In strobe mode, low battery condition is indicated by dropping pulses; e.g., every fourth output pulse is dropped, or three of four pulses is dropped creating an easily distinguishable variance in visible output of the invention.

In another embodiment of the invention, a switch is utilized to control the functions (and/or brightness) of the invention. A variance of this embodiment uses a thumb-wheel, or rotary switch to vary the switching characteristics to produce a variable light output.

In another embodiment, a programmable microprocessor is utilized to provide control functionality.

FIG. 1 shows one embodiment of the present invention (a schematic representation of a LED flashlight 100) having a case 110, a battery 120 or other portable DC power supply, a power supply and control circuit 130, a switch circuit 140, a plurality of LEDs 150, and optionally a feedback circuit 160.

In various embodiments of the present invention, feedback circuit 160 (and similarly the other feedback circuits described herein) controls pulse width and/or frequency as a function of parameters such as battery voltage, LED light output intensity, power dissipation or device temperature, or LED color spectrum output.

Case 110 is any convenient size and shape, and is typically designed to hold the battery, provide a suitable grip to be handheld, and provide a housing for the circuitry and LEDs. In one embodiment, battery 120 includes one or more cells which can be any suitable technology such as alkaline dry cells or rechargeable cells. Alternatively, other portable DC electrical power sources can be used as desired in place of battery 120. Power supply and control circuit (PSCC) 130 responds to switch circuit to apply electrical power from battery 120 to LEDs 150, controlled in order to prevent overloading and premature destruction of LEDs 150 while minimizing power dissipation within PSCC 130, thus maximizing battery life, providing the desired accuracy or level of the amount of light emitted at different battery voltages or other environmental conditions that would otherwise vary the light output. Switch circuit 140 allows the user to control various flashlight functions such as, for example, on/off, setting light level, setting light color, setting pulse or strobe frequency, and checking battery voltage or remaining power. In one embodiment, PSCC 130 provides a pulse train, in which pulse frequency, pulse width, or pulse shape/height, and/or the number of LEDs that are driven, is controlled in order to provide a relatively constant light output level even as battery voltage declines and power is drained. In one embodiment, feedback 160 measures the light output of LEDs 150 (e.g., using a photo diode or other suitable light detecting device) and provides a signal that allows PSCC 130 to adjust the light output to a desired level (typically providing a constant light output even as battery voltage declines as power is drained). In one such embodiment, the width of each pulse is adjusted to keep a constant average light output (widening each pulse as the intensity of light decreases, in order to obtain a constant light output). In one such embodiment, flashlight 100 is used in conjunction with a portable video camcorder or other video camera, and feedback 160 measures the overall ambient light and provides a signal that allows generation of flashlight pulses to compensate for lack of light, in order to provide optimal lighting for the video camera. In one such embodiment, the pulses to the LEDs are synchronized to the video camera frame rate using optional pulse synchronization (sync) signal 170 in order that the light pulse from LEDs 150 is only on when the video camera shutter is collecting light (avoiding light output when the camera will not benefit from it). In another embodiment, feedback 160 measures battery voltage, and increases pulse width, frequency, or height as battery voltage or power declines. In yet another embodiment, feedback 160 measures the current going through LEDs 150, and makes the appropriate adjustment to pulse width or frequency in order to maintain constant or desired light output.

Figure 2:
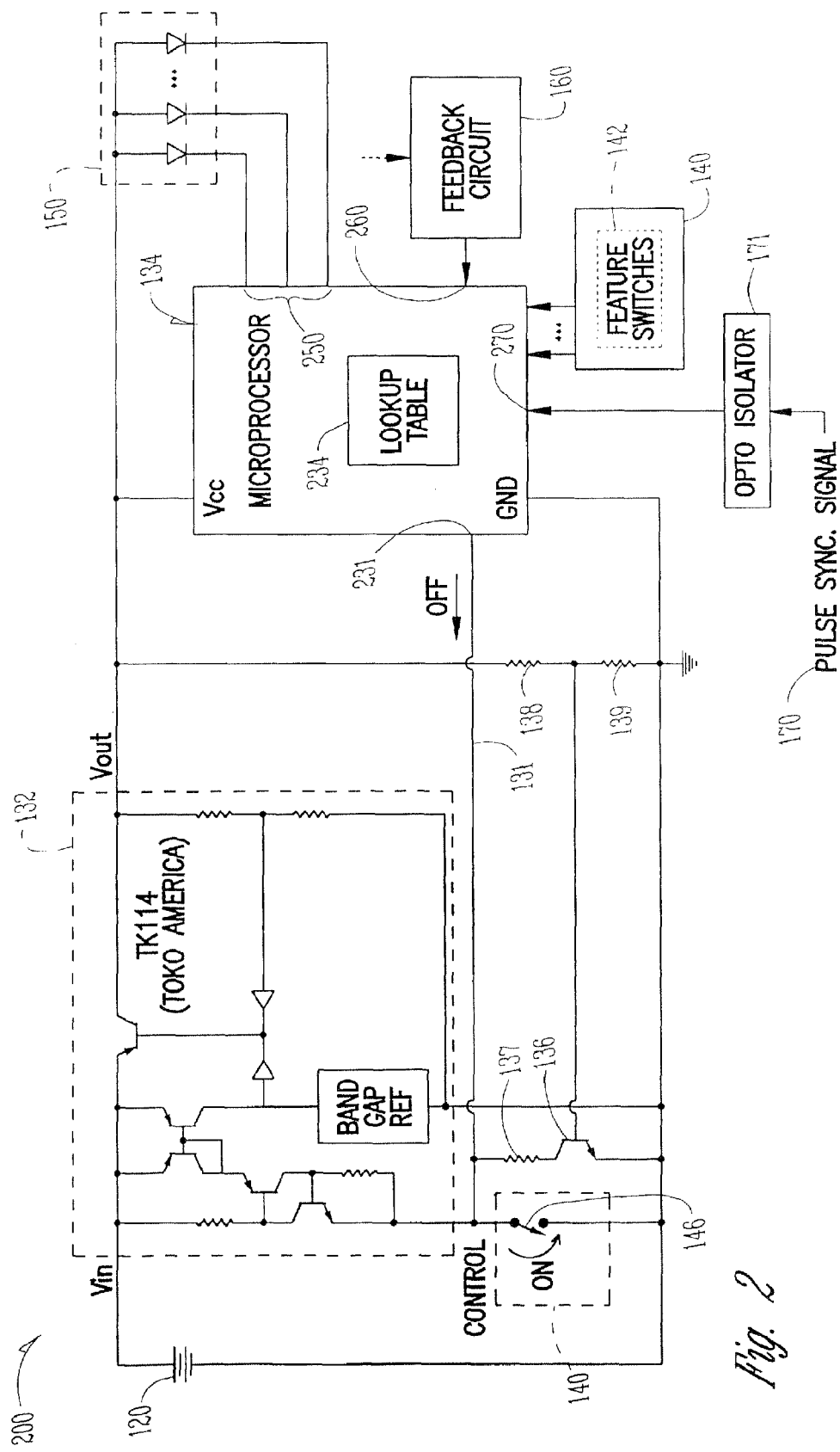
FIG. 2 is a circuit block diagram of an LED flashlight circuit 200, which circuit is used in some embodiments of LED flashlight 100 of FIG. 1 or LED light source in camcorder 500 of FIG. 5 or other devices such as machine-vision systems.

FIG. 2 is a schematic of one embodiment of a circuit used for flashlight 100. In this embodiment, normally open, momentary contact switch 146 is momentarily closed by a user to activate light output. Power-switch circuit 132 (in one embodiment, a TK114 circuit by Toko America available from Digikey Corporation of Thief River Falls, Minn.) is turned on as its control input 131 is shorted to ground by switch 146, thus applying voltage to Vout, which is applied through resistor divider 138-138 to transistor 136. In other embodiments, circuit 132 is replaced by a simple slide switch as is used in conventional flashlights, and which, when closed, connects Vin to Vout (eliminating the need for resistors 137, 138, and 139, switch 146, and transistor 136). Transistor 136 and resistor 137 then maintain the control voltage low enough to keep power circuit 132 turned on even after switch 146 is released by the user to its open position (transistor 136 is "on" as long as circuit 132 is on and applying battery voltage to Vout). Thus power is applied to Vout until an OFF signal is set high on line 131 by microprocessor (MP) 134 (resistor 137 has a resistance that is set to a value that is small enough to keep the control pin of circuit 132 low unless overridden by the OFF signal from MP 134 going high). Microprocessor 134 is any suitable microprocessor, such as a PIC16C62X microcontroller by Microchip and available from Digikey Corp. of Thief River Falls, Minn., 56701. The PIC16C62X includes two analog comparators with a programmable on-chip voltage reference, a timer, and 13 input/output (I/O) pins each capable of direct LED driving of 25 mA source or sink. In one embodiment, MP 134 is programmed to receive a feedback signal 260 from feedback circuit 160, and on the basis of the feedback signal, adjust the drive signal(s) 250 to LEDs 150, thus adjusting the light output. In one such embodiment, a lookup table 234 is used to convert a digital value derived from feedback signal 260 into a digital value used to control drive signal 250. In one embodiment, optional feature switches 142 are provided to control various parameters of light output such as, for example, intensity, color, duration (i.e., time until automatic power down), frequency (i.e., a strobe control), etc. In one embodiment, an external pulse sync signal 170 is provided, isolated though a standard opto-isolator circuit 171, and provided as an input to pulse sync input pin 270 of MP 134. In one such embodiment, pulse sync signal 170 is driven from a video camera (such as a camcorder or a machine-vision video camera), in order to synchronize light output with the light-gathering/shutter-open times of the camera. In another such embodiment, pulse sync signal 170 is driven from a spark-plug-wire pickup in order to provide a timing strobe of light pulses for tuning an internal combustion engine.

In one embodiment, feature switches 142 include momentary contact switches in pairs, one switch of the pair used to increase a particular parameter, and the other switch of the pair used to decrease the particular parameter (such as is done commonly in television remote control devices). In one such embodiment, a pair of switches increases/decreases overall light output intensity. In another such embodiment, color is adjusted, e.g., using one pair of buttons for blue LED output, another pair for green LED output, and a third pair for red LED output; or using one pair to control the X-coordinate and another pair to control the Y-coordinate of chromaticity (such as a CIE chromaticity diagram's X and Y coordinates). In yet another such embodiment, a pair of switch buttons increases/decreases the remaining timeout value. In one embodiment, as a feature switch is pressed to increase or decrease a parameter, the number of LEDs that are "on" are varied to provide a visual indication to the user of the value of that parameter, for example the timeout value could be varied from one to ten minutes until power off, and as the button to increase that parameter is held down, the timeout parameter is increased successively from one to ten, and a corresponding number of LEDs (one to ten) are turned on to provide this visual indication. In other embodiments, audible indications of such parameters are provided, e.g., by providing variable pitch or numbers of clicks to give the user feedback as to the value of the parameters being adjusted or measured.

A primary feature of some embodiments of the present invention is to provide a large number of individual LEDs in order to provide sufficient generalized and/or focused illumination to be useful as a handheld flashlight, or in particular, as an illumination source for a scene or object to be imaged by a video camera (e.g., in a camcorder or machine-vision system). With current low-cost, high intensity LEDs having a luminous intensity of, say 2 cd, twenty to fifty LEDs are typically needed to provide a good flashlight, although in some applications as few as seven LEDs provide desirable results. In one such embodiment, each individual LED is separately packaged in a transparent encapsulant (e.g., a T 1¾ package) that provides manufacturing efficiencies and provides better heat dissipation by spreading the active light emitting chips apart from one another. In some embodiments, white LEDs are used (such as white LEDs that utilize a blue LED chip and a YAG phosphor that converts a portion of the blue light to yellow, thus yielding a white-appearing light output, such as part number NSPW 310AS available from Nichia Chemical Industries Ltd. of Japan and Nichia America Corp., 3775 Hempland Road, Mountville Pa., 17554). In other embodiments, standard high-efficiency colored LEDs of red, yellow, green, and/or blue are used to provide light of the desired intensity and color. In one such embodiment, LEDs of each color are controlled separately in order to provide the desired overall hue or whiteness of the combined light output.

Figure 5:
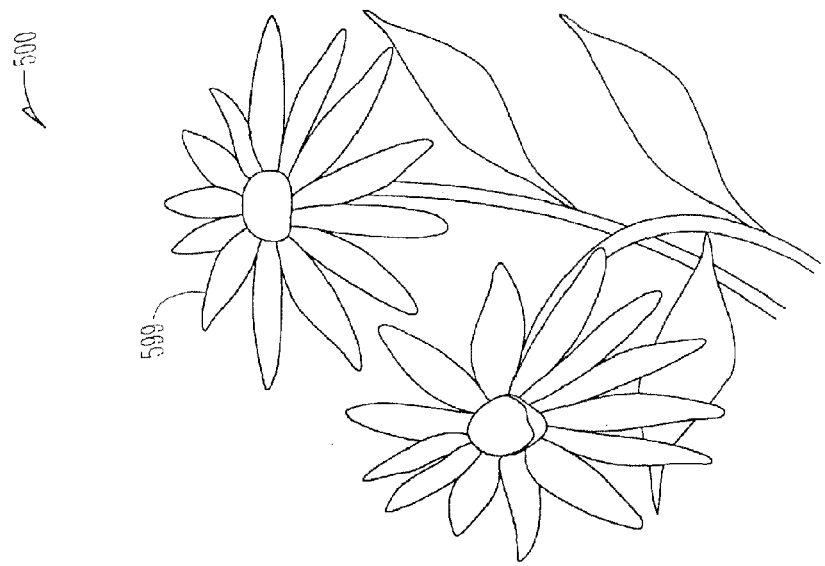
FIG. 5 is a diagram showing a controlled LED light source is integrated into a handheld camcorder 500.
Figure 5:
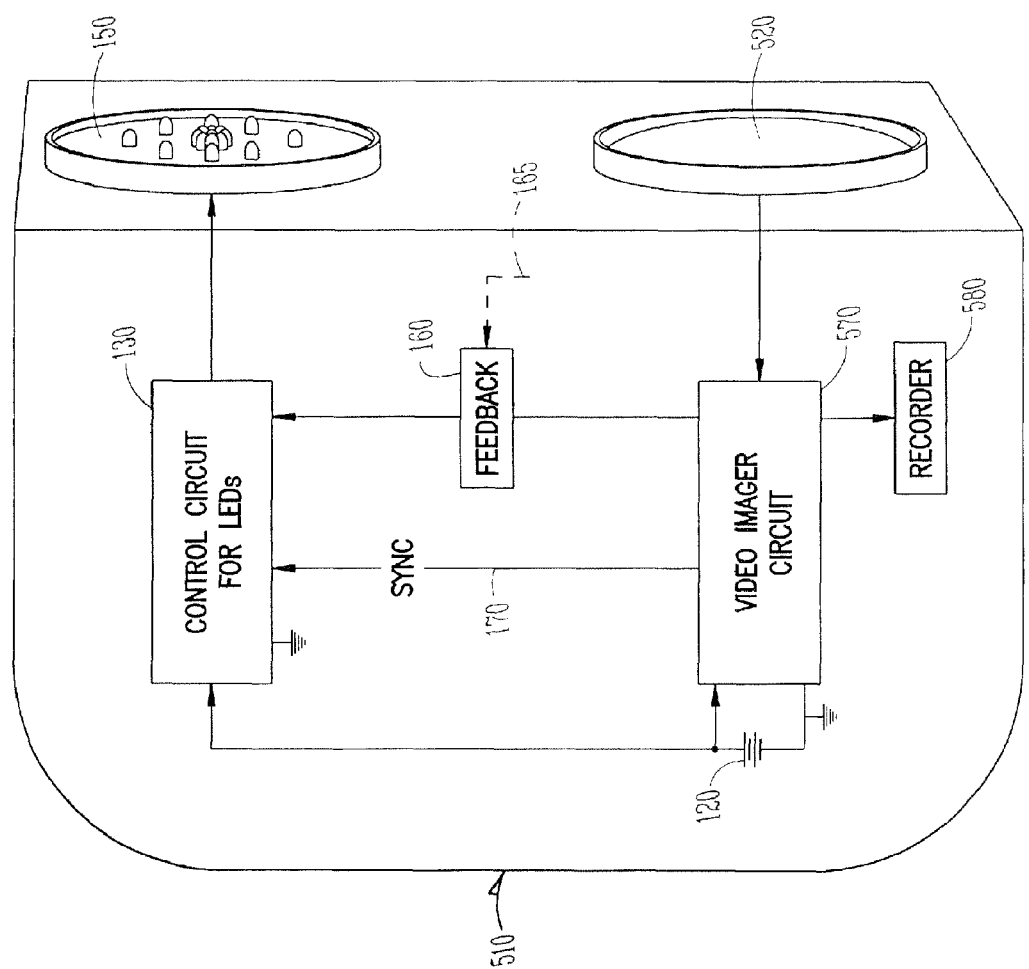

In an application such as providing illumination for a video camera, feedback circuit 160 measures the video output signal from the camera and provides a feedback signal 260 that allows adjustment of the light output of LEDs 150 in order to optimize the video signal. In one such embodiment, as shown in FIG. 5, the controlled LED light source is integrated into a handheld camcorder 500. In one such embodiment, the video camera circuit also provides pulse sync signal 170 in order to synchronize the light output to the video light gathering time windows. In another such embodiment, feedback circuit 160 measures the color balance of the video output signal, and provides separate feedback intensity control for each of a plurality of (e.g., two or three) separate groups of color LEDs, for example, red, green, and blue. In one embodiment, green LEDs such as part number NSPG 500S and blue LEDs such as part number NSPB 500S, both available from Nichia Chemical Industries Ltd. of Japan and Nichia America Corp., 3775 Hempland Road, Mountville Pa., 17554 are used, and red LEDs such as part number HLMP-C115 available from Hewlett Packard Company.

Figure 3:
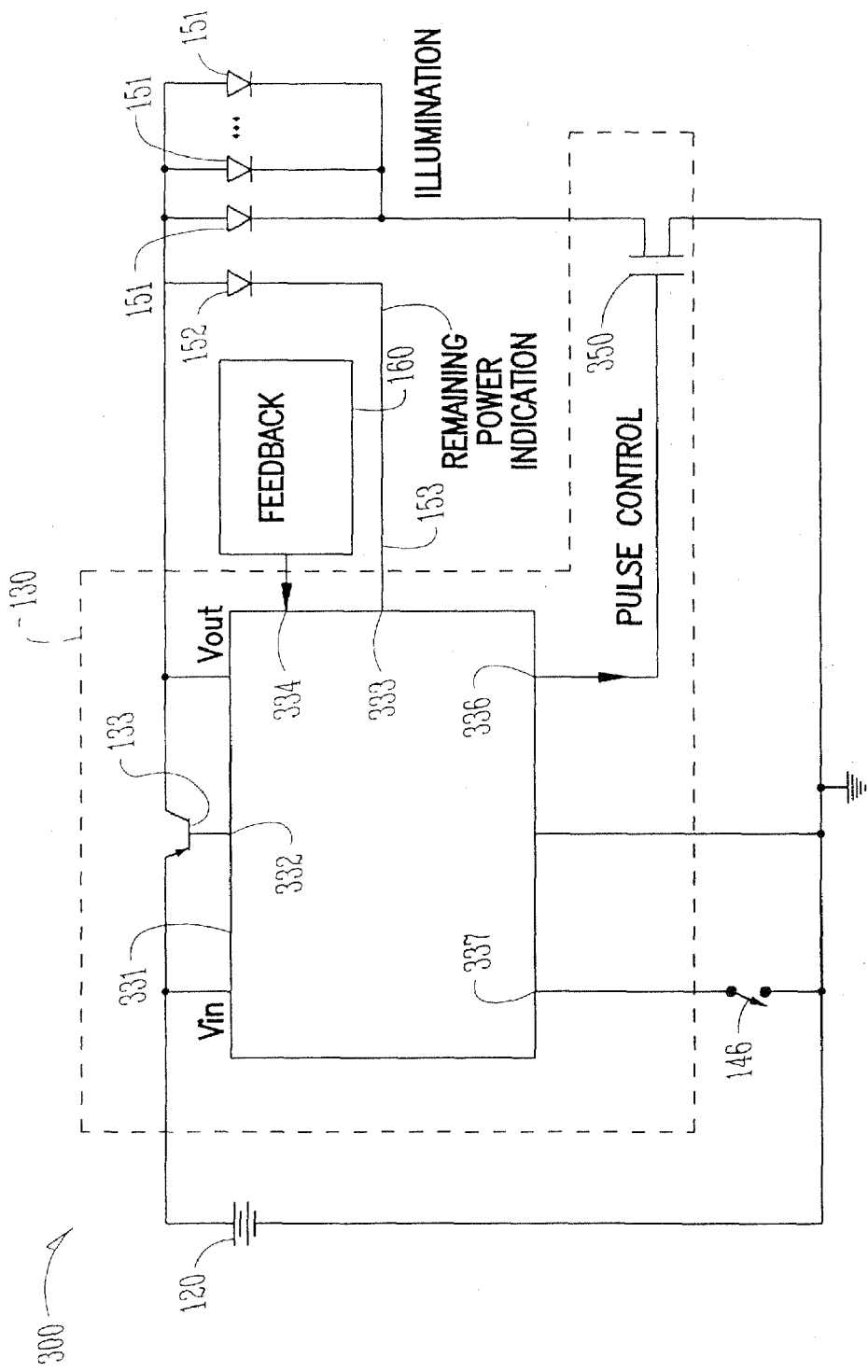
FIG. 3 a circuit block diagram of an LED flashlight circuit 300, which circuit is used in some embodiments of LED flashlight 100 of FIG. 1 or LED light source in camcorder 500 of FIG. 5 or other devices such as machine-vision systems.

FIG. 3 a circuit block diagram of an LED flashlight circuit 300, which circuit is used in some embodiments of LED flashlight 100 of FIG. 1 or LED light source in video camera 500 of FIG. 5. Circuit 331 replaces circuit 132 and 134 of FIG. 2 using similar circuit concepts (however, in one embodiment, the entire circuitry of circuit 331 is integrated onto a single integrated circuit chip). When switch 146 is momentarily closed, circuit 331 draws output pin 332 low, turning on PNP transistor 133, which remains turned on until circuit 331 again detects that switch 146 is momentarily closed, at which time pin 332 is allowed to float high, turning off the flashlight circuit 300. One or more output pins 336 drive one or more low-threshold high-power MOSFETs 350 (e.g., a plurality of MOSFETs 350 are used to drive groups of LEDs of different colors, as described above). In some embodiments, pin 336 provides a variable pulse control signal to vary pulse width, pulse frequency, or both in order to control light output as described above. In the embodiment shown, output pin 333 is driven low to turn on LED 152, and in one such embodiment, pulses LED 152 in a manner that the pulses are perceptible to the human eye, and varying the pulse pattern or timing in order to indicate the estimated remaining battery power. For example, in one embodiment, from one to ten short, individually perceptible pulses closely spaced (e.g., one-third of a second apart) pulses are driven each time the flashlight is initially turned on, that is, ten pulses closely spaced indicate that 100% of the battery power remains, 9 pulses indicate that 90% of the battery power remains, . . . and 1 pulse indicates that 10% of the battery power remains. In another such embodiment, LED 152 is repeated pulsed in this manner, e.g., ten pulses spaced at ⅓ second, then a 3 second period of time when LED 152 is off, ten pulses spaced at ⅓ second, then a 3 second period of time when LED 152 is off, in a repeating pattern as long as the flashlight is on. In one such embodiment, this provides the user with the only indication of remaining battery life, since LEDs 151 are driven to provide constant illumination, regardless of battery voltage variations or other factors that would otherwise vary light output. In other embodiments, feedback circuit 160 is omitted, and such factors do affect light output. Feedback circuit 160 is as described above, and measures light emitted by the LEDs, battery voltage, LED current, and/or other parameters in order to provide circuit 331 with information to be used to control output pin 336, and thus light output. In one embodiment that measures light output in feedback circuit 160, the width of the pulse needed to obtain a certain level of light output provides indirect information regarding remaining battery power, and is measured and converted into the visual indication of remaining power to be displayed by LED 152. In another embodiment, the amount of remaining battery power is visually indicated by turning on a proportional number of the LEDs 151 as power is initially applied, so the user, by seeing how many LEDs are lit during this initial power-indication mode, can determine the remaining battery power. Thus, by varying the number of perceptible flashes or the number of lit LEDs, or other visual indication, the remaining battery power can be conveyed to the user.

Figure 4:
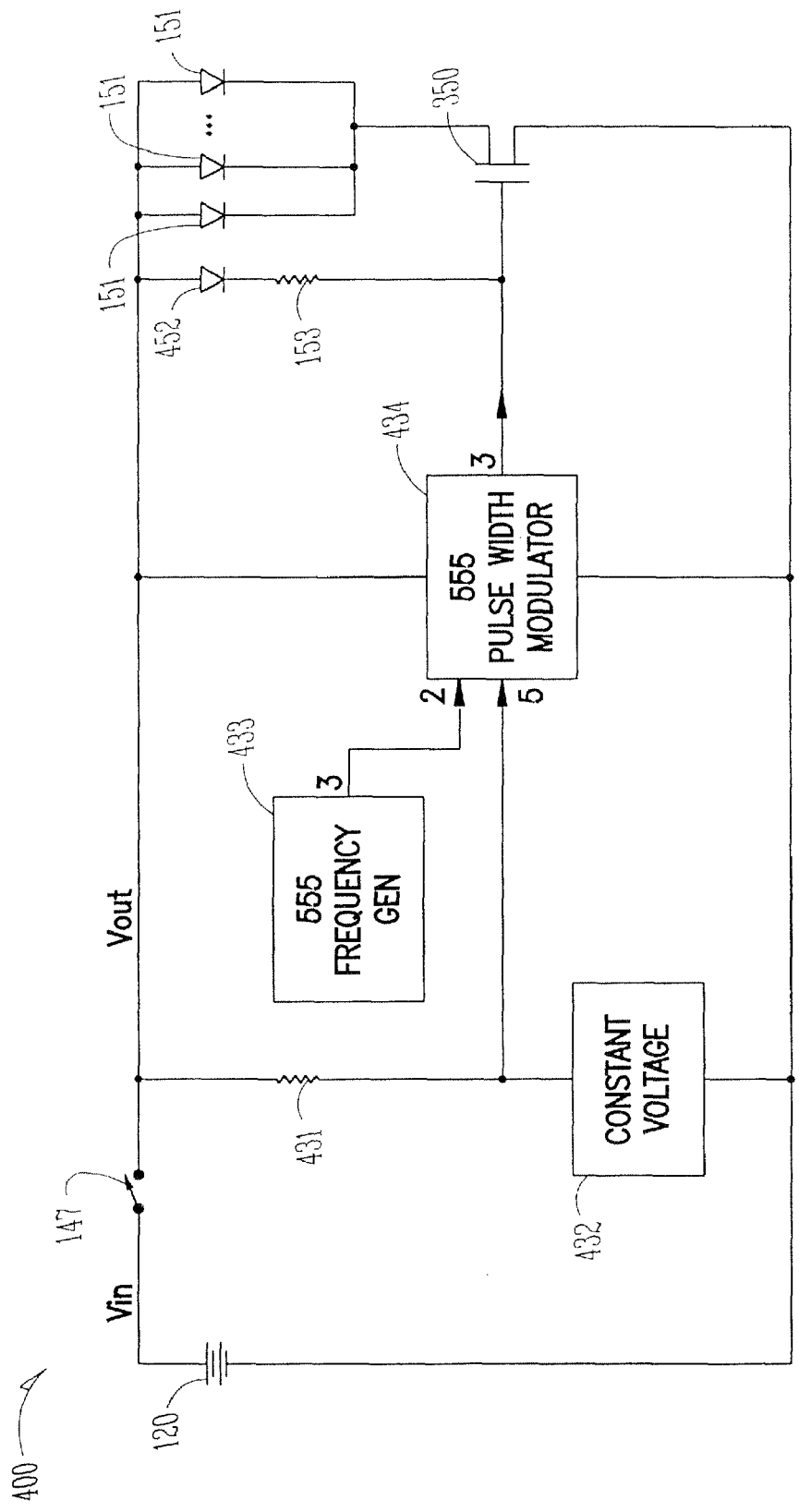
FIG. 4 a circuit block diagram of an LED flashlight circuit 400, which circuit is used in some embodiments of LED flashlight 100 of FIG. 1 or LED light source in camcorder 500 of FIG. 5 or other devices such as machine-vision systems.

FIG. 4 a circuit block diagram of an LED flashlight circuit 400, which circuit is used in some embodiments of LED flashlight 100 of FIG. 1 or LED light source in video camera 500 of FIG. 5. In this circuit 400, switch 147 applies (and removes) power to the circuit 400. In this embodiment, circuit 433 provides a continuous series of very short pulses (e.g., 10 microseconds wide each) at a frequency much higher than the flicker rate of the human eye (e.g., between 100 Hz to 50 KHz) that drive the trigger input of circuit 434 (in this embodiment, circuits 433 and 434 are each 555-type timer circuits, or each are one-half of a 556 dual timer). Resistor 431 and constant voltage circuit 432 provide a fixed voltage to control pin 5 of circuit 555. Since circuit 434 will operate over a wide range of voltage, as the voltage of Vout decreases, the constant voltage at pin 5 (from circuit 432) will be relatively higher, thus increasing the pulse width generated by circuit 434 and output on its pin 3. As in FIG. 3, MOSFET 350 shorts the anodes of LEDs 151 to ground for the duration that pulse from circuit 434 is high. This can provide 100 milliamps or more through each LED 151 when the battery is fully charged, but only for a very short pulse. While the 100 mA, if constant, would overload the LEDs, the short pulses are tolerated. As the battery power is drained, the voltage of Vout decreases, and the pulse width increases. In this way, pulse width increases as battery voltage decreases, thus compensating at least partially for the reduced peak intensity of the LEDs at lower voltage. On the other hand, LED 452 is driven directly from output pin 3 of circuit 434 though current limiting resistor 153. LEDs 151 are "on" for proportionally longer as the pulse width increases, however, LED 452 is on proportionally shorter as pulse width increases, thus LED 452 becomes dimmer as voltage decreases, providing a visual indication of remaining battery power.

FIG. 5 is a diagram showing a controlled LED light source is integrated into a handheld camcorder 500. In this embodiment, camcorder 500 includes lens 520, case 510, video circuit 570, recorder apparatus 580, battery 120, control circuit 130, feedback circuit 160, and LEDs 150. Typically, lens 520 forms an image of object 599 onto a CCD imaging array that is part of video circuit 570 (i.e., lens 520 and video circuit 570 form a video camera), and the corresponding video signal is recorded onto media (such as video tape or recordable digital video disk (DVD)) in recorder 580. In other applications such as machine vision, the video signal is coupled to an image processor that in turn controls some manufacturing process, for example, and part inspection or robot arm control is accomplished. In one embodiment, feedback circuit 160 takes input from the video signal only in order to control the amount of light emitted from LEDs 150. In other embodiments, feedback circuit 160, instead of or in addition to input from the video signal, takes feedback input 165 from a photosensor in order to control LED light output.

Figure 6:
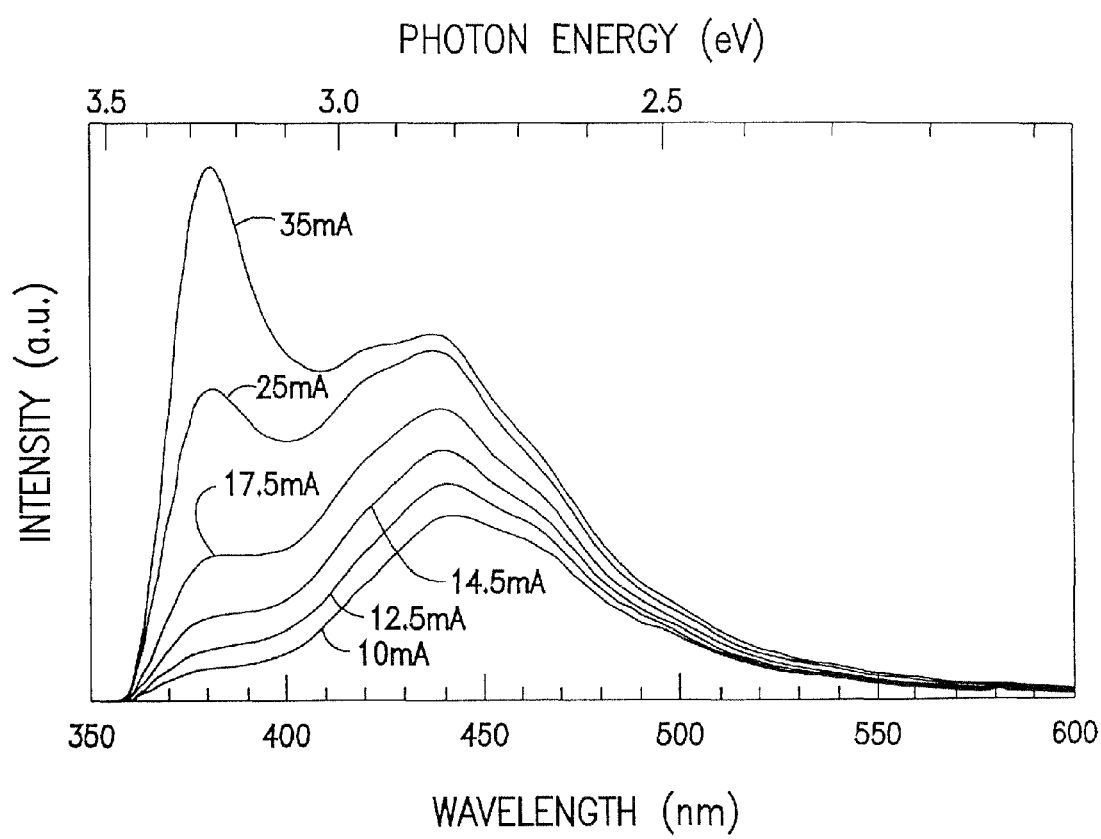
FIG. 6 is a graph of color spectrum versus current for an LED to be used in one embodiment of the present invention.

FIG. 6 is a graph of color spectrum versus current for an LED to be used in one embodiment of the present invention. As is seen in the graph, as the LED current increases from 10 mA to 35 mA, the color spectrum of this exemplary LED shifts from centered at approximately 440 nanometers (blue) to centered at approximately at 380 nanometers (ultraviolet), and the overall intensity increases with increasing current. Such an LED is described by M. Schauler et al., "GaN based LED's with different recombination zones," *MRS Internet Journal of Nitride Research*, Volume 2 Article 44, Oct. 8, 1997 (internet address: nsr.mij.mrs.org/2/44/complete.html). In one such embodiment, the above described pulse-width control or frequency control circuits (such as feedback circuit 160 and control circuit 134) are used to maintain a desired illumination intensity as the color spectrum is changed by changing the current through the LED. In one such embodiment, color balance as measured by feedback circuit 160 is used to change the current of each pulse and thus the color spectrum in order to control or maintain color balance.

Figure 7:
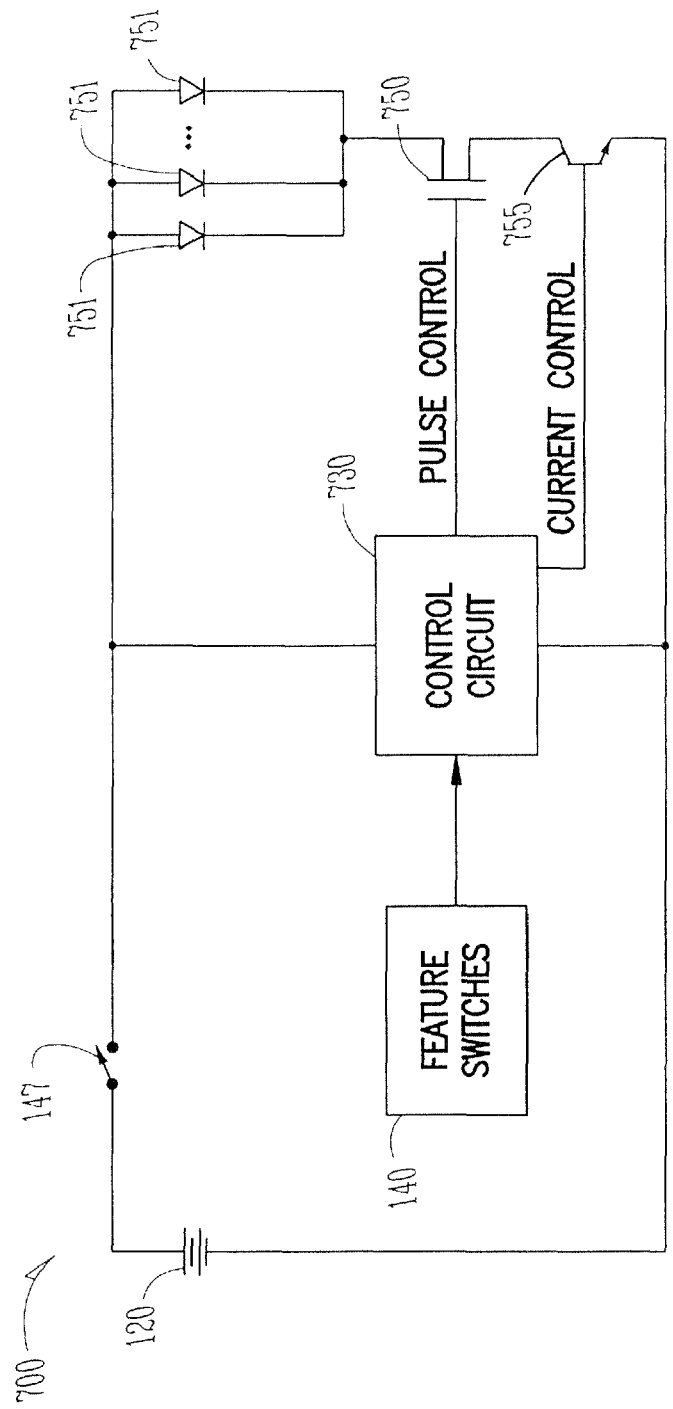
FIG. 7 is circuit block diagram of an LED illumination device circuit 700, which circuit is used in some embodiments of LED flashlight 100 of FIG. 1 or LED light source in camcorder 500 of FIG. 5 or other devices such as machine-vision systems.

By controlling the amount of current (the height of each pulse), the color spectrum of the output light can be adjusted (i.e., for the above described LED, the color spectrum center wavelength is adjustable from 440 nm blue to 380 nm ultraviolet), and by simultaneously controlling pulse width and/or pulse frequency, the intensity can also be controlled (i.e., one can vary the intensity, or even keep a constant intensity as the pulse height is adjusted to change color output), e.g., by varying pulse width to provide a constant perceived or average intensity even as the color changes. FIG. 7 shows one circuit 700 to accomplish such control. The user controls the color desired via switches 140 coupled to control circuit 730. Circuit 730 then controls the current of transistor 755 by well-known techniques such as a current minor, and the pulse width or frequency to transistor 750 as described above (in one embodiment, a lookup table is used to choose a predetermined pulse width based on the user-selected or set color, and the current is determined by another corresponding lookup table is used to choose an appropriate current).

Figure 8:
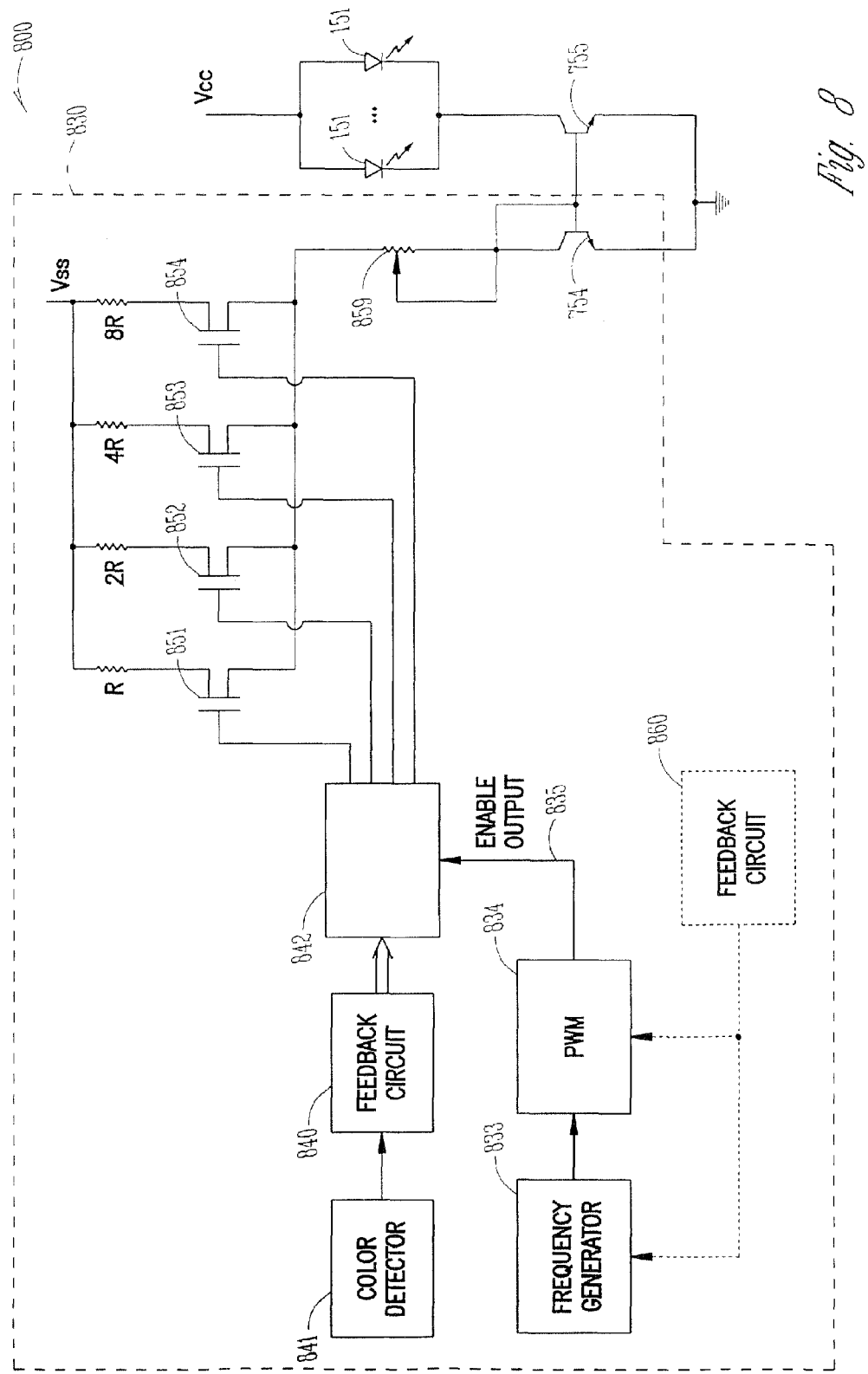
FIG. 8 is circuit block diagram of an LED illumination device circuit 700 that uses a current mirror.

FIG. 8 shows another circuit 800 to accomplish such control. Feedback circuit 840 is adjusted to controls the color desired based on a detected color signal from color detector 841 in control circuit 830. Control circuit 830 then controls the current of transistor 755 by a current mirror with transistor 754. In addition, the pulse width or frequency to gated register 842 is optionally controlled by one or more feedback circuits 860 (which is controlled by a signal indicating supply voltage, the temperature of LEDs 151, measured light output intensity or any other parameter over which control is desired) as described above (in one embodiment, a lookup table is used to choose a predetermined pulse width based on the user-selected or set color, and the current is determined by another corresponding lookup table is used to choose an appropriate current). In one embodiment, gated register 842 receives and stores a binary number value from feedback circuit 840, and receives a variable-frequency and/or variable-width output-enable pulse 835 from pulse-width modulator (PWM) circuit 834. PWM circuit 834 is driven by frequency generator 833. In one embodiment, both PWM circuit 834 and frequency generator 833 are set to provide fixed frequency and fixed width pulses (i.e., no feedback used). In other embodiments, one or both of frequency and pulse width are variable, and in some embodiments, the variability is controlled by feedback, and in other embodiments these parameters are set-able to values chosen by a user. In some embodiments, a maximum frequency for a given pulse width, or a maximum pulse width for a given frequency is predetermined in order to prevent destruction of LEDs 151 from excessive power. In other embodiments, a temperature feedback signal indicating the temperature of LEDs 151 is coupled to feedback circuit 860 to prevent overheating of LEDs 151. In some embodiments, feedback circuit 860 simply inhibits and/or shortens pulses based on temperature feedback or on a predetermined maximum rate limit or pulse-width limit. FET transistors 851, 852, 853, and 854, and their respective resistors R, 2R, 4R, and 8R, along with trimming resistor 859 form a controllable variable current source, which is multiplied by approximately the factor $\beta/(\beta+2)$ by the current mirror of transistors 754 and 755 to get the sum of the current though LEDs 151. For optimal results, transistors 754 and 755 are formed as s single integrated three-terminal device on a single substrate, in order to achieve matched betas and temperature dependence. In one such embodiment, transistor 755 is formed of multiple individual transistors wired in parallel in order to achieve higher output current (at the collector of transistor 755) for a given input current (at the collector of transistor 754 and the bases of the two transistors). In the embodiment shown, this current mirror allows circuit 830 to determine the current through transistor 755 substantially independent of the voltage of Vcc and the voltage-current relationships of LEDs 151. In the embodiment shown, LEDs 151 are wired in parallel, however, in other embodiments a single LED device is used, or a plurality of LEDs 151 are instead wired in series, or in a series-parallel arrangement as is shown in FIG. 10.

Figure 9:
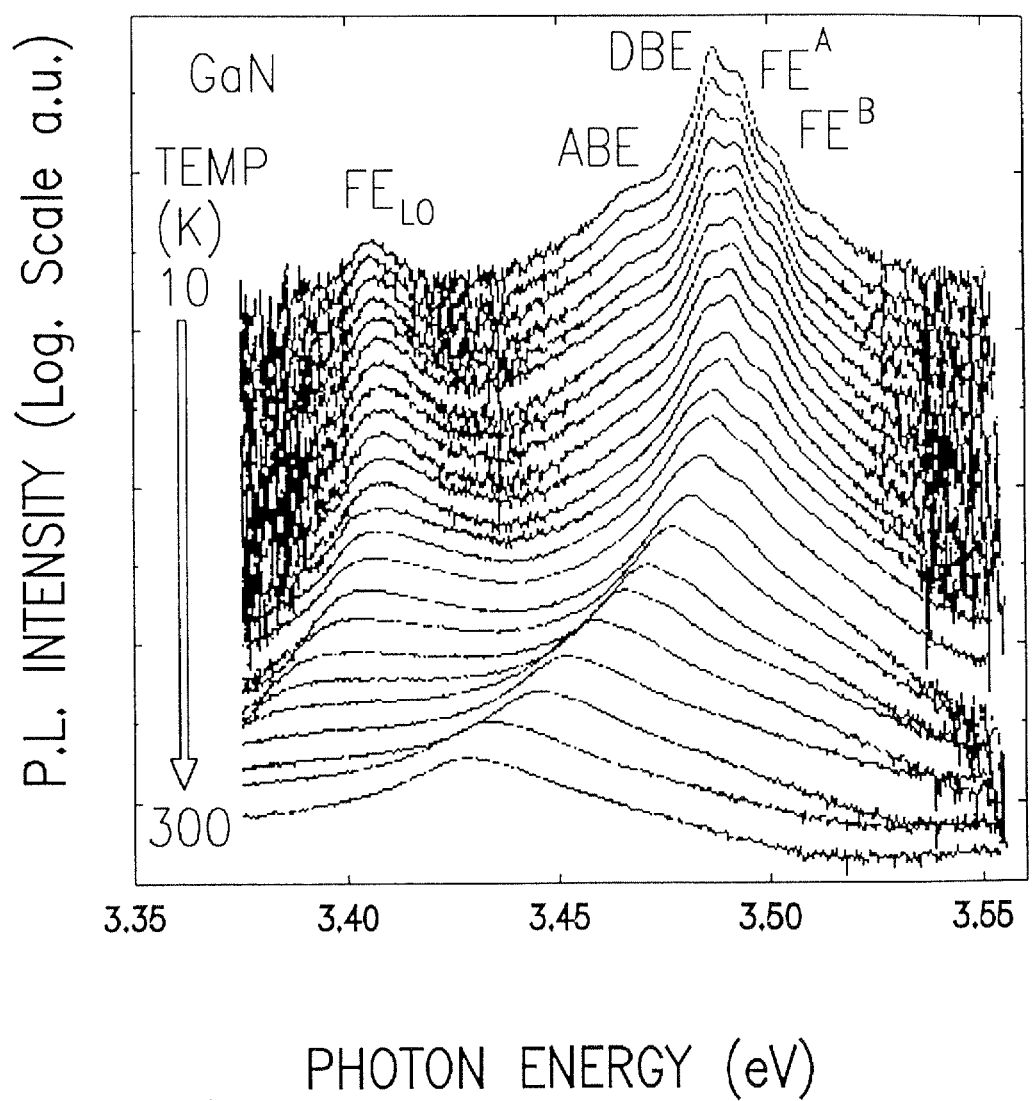
FIG. 9 is a graph of color spectrum (photoluminescence) versus temperature for an LED to be used in one embodiment of the present invention.

FIG. 9 is a graph of color spectrum (photoluminescence) versus temperature for an LED to be used in one embodiment of the present invention. Such an LED is described by B. Monemar et al., "Free Excitons in GaN," *MRS Internet Journal of Nitride Research*, Volume 1 Article 2, Jul. 8, 1996 (internet address: nsr.mij.mrs.org/1/2/complete.html). In one embodiment of the present invention, a GaN or InGaN LED that exhibits a temperature-dependent color spectrum light output (i.e., electroluminescence, or light output due to a current flowing through the LED which also exhibits color-temperature dependence, as opposed to the photoluminescence graphed in FIG. 9) has its color spectrum controlled by one of the circuits described for FIG. 1, 2, 3, 4, 5, 7, or 8. In one such embodiment, feedback reduces or eliminates color changes that would otherwise occur as temperature of the LED changed. In another such embodiment, color changes are purposely induced by changing the temperature of the LED, either by heating or cooling the LED with an external temperature-change device such as a resistor, or by inducing internal temperature changes by changing the average driving current to effect a change in junction temperature in the LED. In some such embodiments, a color detector such as are well known in the art is used to provide a signal to provide feedback to control temperature.

Figure 10:
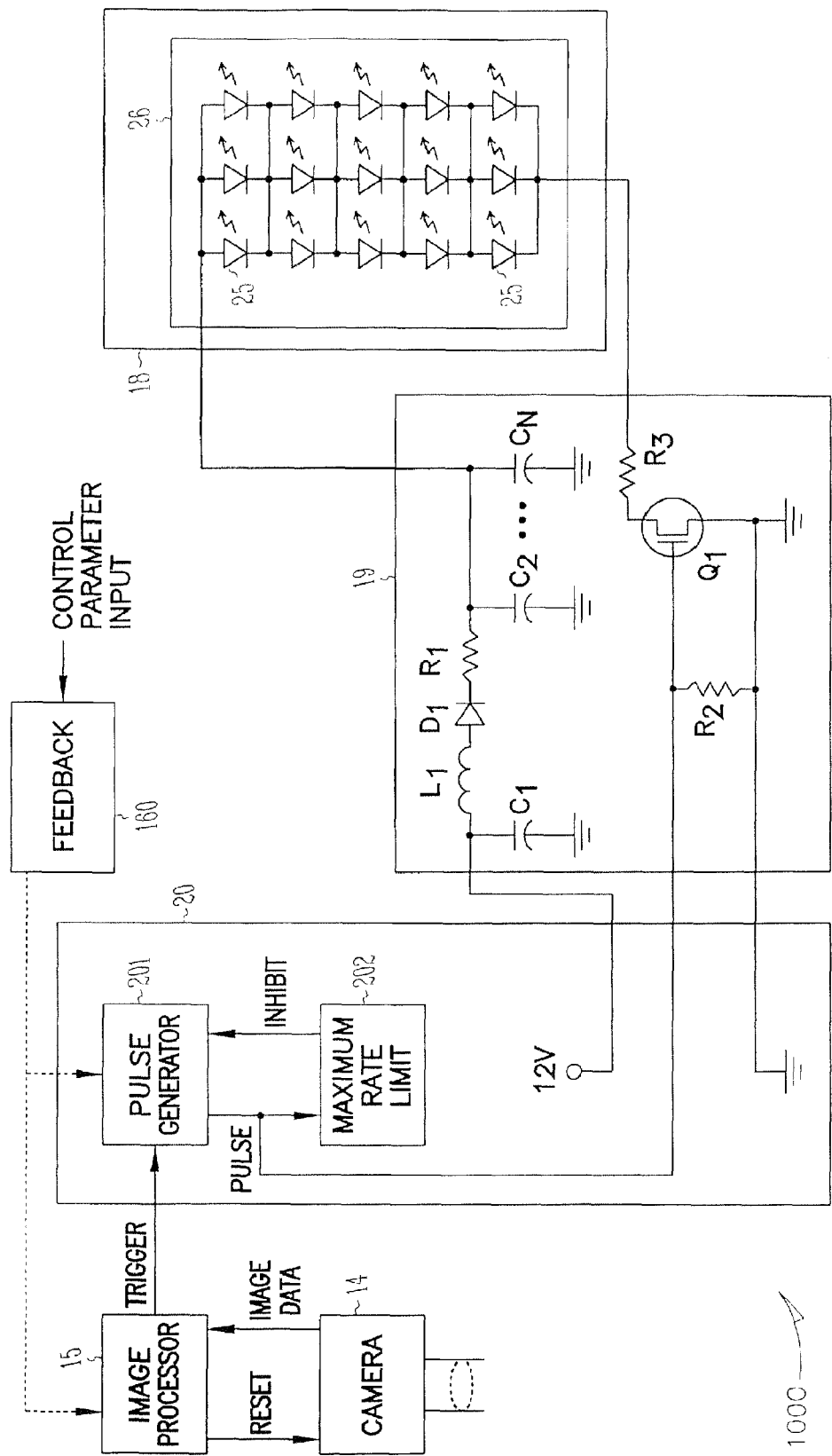
FIG. 10 is circuit block diagram of a machine vision system using an LED illumination device according to the present invention.

FIG. 10 is a block diagram of the control circuit 130 for one embodiment of illumination system 100. An Oscillator 15 (in the embodiment shown, oscillator 15 is part of an image processor as shown which is coupled to an electronic camera 14, e.g., a charge-coupled device (CCD)), controlled by pulse-frequency circuit (such as circuit 833 of FIG. 8 or frequency generator 433 of FIG. 4), sends a trigger signal to power supply 20. In one embodiment, the image processor 15 generates one pulse or a plurality of pulses for each CCD frame, wherein the number of pulses generated is sufficient to provide a desired accumulation of light received by camera 14 for each frame. Within power supply 20, the trigger signal activates pulse generator 201 to generate a control pulse of a length determined by pulse-length circuit (such as PWM circuit 834 of FIG. 8 or PWM 434 of FIG. 4) The control pulse is used to turn on transistor Q1 to generate a flash on LEDs 25, which is current-limited by resistor R3. The control pulse also activates the maximum-rate-limit circuit 202, which inhibits any further control pulses from pulse generator 201 for a predetermined amount of time. The 12 volt signal from power supply 20 is filtered by the low-pass filter comprising C1, L1, D1, and R1, and charges capacitors C2 through $C_N$ (in one embodiment, N is 12). In one such embodiment, C1 through C12 are each 2200 µf, L1 is 40 µH iron-core, D1 as a 1N4001 diode, and R1 is a 0 ohm conductor. C2 through $C_N$ are discharged through fifteen series-wired LEDs 25, which in this embodiment are wired in a parallel-series manner as shown, and R3 and Q1, as activated by the above-described control pulse. In one such embodiment, R3 is replaced by a zero-ohm conductor, and the voltage drop across the LEDs and Q1 is used to self-limit the current through the LEDs. The control pulse is fed across resistor R2, which in one embodiment is 100KΩ, to develop the necessary voltage for driving transistor Q1, which in this embodiment is a MTP75N05HD MOSFET.

Figure 11:
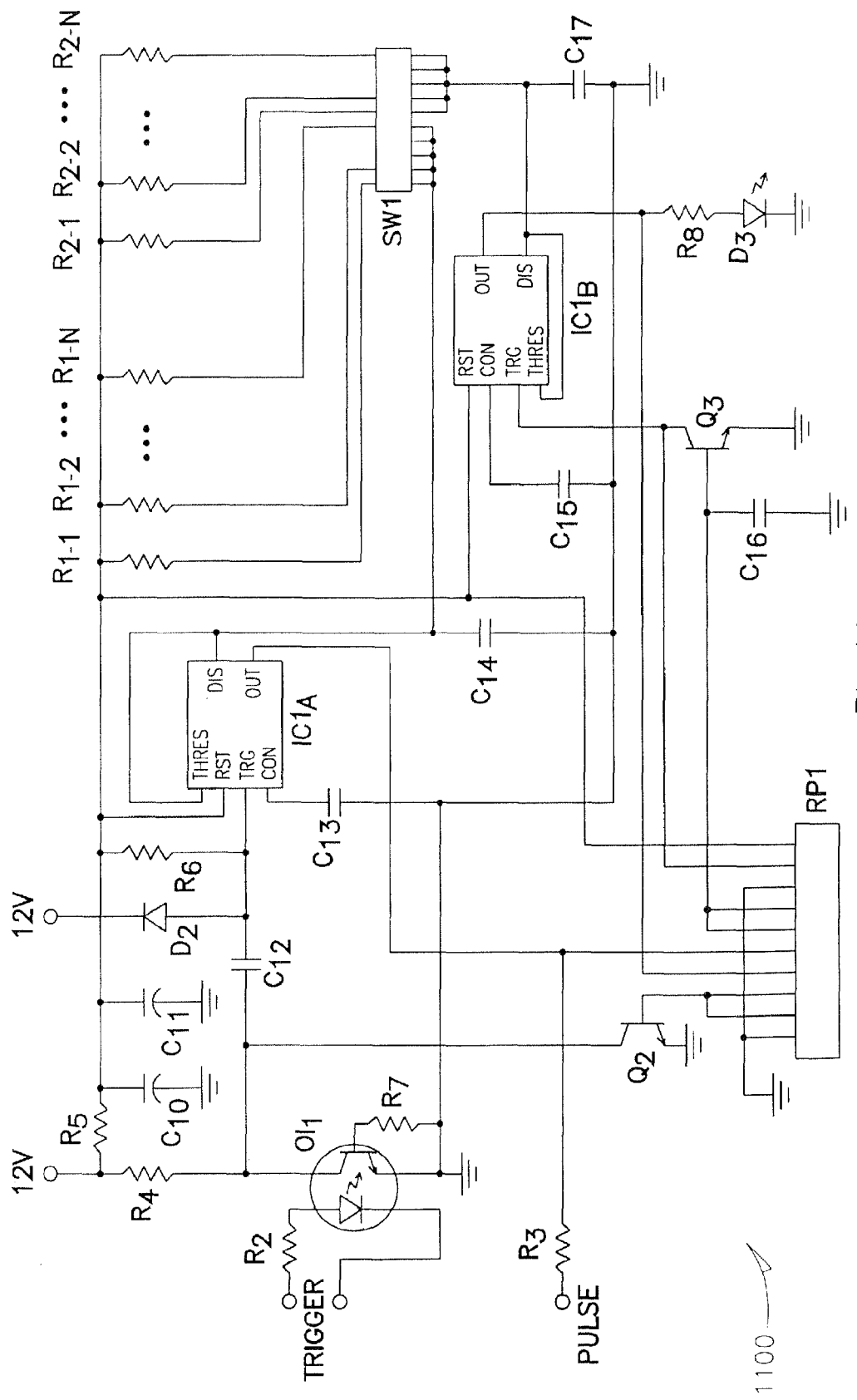
FIG. 11 is circuit block diagram of an LED illumination device according to the present invention.

FIG. 11 is a more-detailed schematic diagram of power supply 20. The input trigger is fed through resistor R2 to drive the input of opto-isolator OI1. The output of opto-isolator OI1 is coupled through capacitor C12 (and the associated circuit R4, R6 and D2) to the TRG input of timer circuit $1C1_A$. (In one embodiment, timers $1C1_A$ and $1C1_B$ are each ½ of a 556-type dual timer.) The timing constant of timer $1C1_A$ is set by C14 and R1-x, (where x is selected from 1 through N), and determines the pulse width of the control pulse driving Q1, and thus the LEDs. In one embodiment, five selectable pulse widths are predetermined and selected by SW1, which is a five-way exclusive dual-pole-single-throw switch, wherein one resistor of the set R1-1 through R1-N is selected for connection to the DIS input pin of $1C1_A$, and a corresponding one resistor of the set R2-1 through R2-N is selected for connection to the DIS input pin of $1C1_B$. The timing constant of timer $1C1_B$ is set by C17 and R2-x, (where x is selected from 1 through N), and determines the minimum time between control pulses driving Q1, and thus the LEDs. In one embodiment, the five selectable predetermined pulse widths are 25 microseconds (μs), 50 μs, 100 μs, 200 μs and 500 μs; the corresponding maximum pulse rates controlled by maximum rate limit circuit 202 are 200 Hz, 120 Hz, 60 Hz, 30 Hz, and 10 Hz, respectively, and are predetermined and selected by SW1. Thus, in the embodiment which uses a 60 Hz camera image rate, 100 μs-long control pulses are used to activate LEDs 25. In one embodiment, it is desired to have an average LED illumination intensity of at least ten times the ambient light; thus, when imaging device 14 is taking one frame every 16.7 milliseconds, a 100 microsecond pulse should be at least 1670 times as intense as the ambient light. In one such an embodiment, a shroud is used to reduce the ambient light, and a red filter (substantially transparent to the peak wavelength of illumination source 18) is placed over the lens of imaging device 14 in order to reduce ambient light and pass the light of illumination source 18. The control pulse output signal is driven through resistor R3.

In one embodiment, opto-isolator OI1 is a 4N37-type part, resistor R2 is 100Ω, resistor R3 is 100Ω, resistor R7 is 1MΩ, resistor R8 is 1KΩ and visible-color LED D3 indicates when the circuit is active, resistor R4 is 4700Ω, resistor R5 is 10Ω, resistor R6 is 10KΩ, diode D2 is a 1N914, resistor R1-1 is 2.26KΩ, resistor R1-2 is 4.53KΩ, resistor R1-3 is 9.1KΩ, resistor R1-4 is 18.2KΩ, resistor R1-5 is 45.3KΩ, resistor R2-1 is 37.4KΩ, resistor R2-2 is 75KΩ, resistor R2-3 is 150KΩ, resistor R2-4 is 301KΩ, resistor R2-5 is 909KΩ, C14 is 0.01 μF, C17 is 0.1 μF, C12 is 0.001 μF, C10 is 100 μF, C11 is 0.1 μF, C13, C15, and C16 are each 0.01 μF, Q2 and Q3 are each 2N3904 NPN transistors, and RP1 is a 10KΩ resistor pack.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus comprising:
   a casing;
   a light-emitting diode mounted to the casing;
   a DC voltage source that is mounted to the casing and having an amount of electrical power;
   a user interface that receives input from a user; and
   a control circuit, operably coupled to the user interface, the DC voltage source, and the light emitting diode, wherein the control circuit generates a series of pulses to drive the light-emitting diode to adjust a first characteristic of light from the light-emitting diode based at least in part on the received input from the user while maintaining an average intensity of the light from the light-emitting diode as a voltage of the DC voltage source varies, and wherein the control circuit maintains the average intensity of the light from the light-emitting diode while minimizing power dissipation within the control circuit by not having a resistor in series with the light-emitting diode and the DC power source.

2. The apparatus of claim 1, wherein the first characteristic of the light from the light-emitting diode that is controlled by the control circuit based at least in part on the received input from the user is the average light intensity, wherein the apparatus is a handheld electronic device, and wherein the DC voltage source is a battery within the electronic device.

3. The apparatus of claim 1, wherein the first characteristic of the light from the light-emitting diode that is controlled by the control circuit based at least in part on the received input from the user is the average light intensity, wherein the apparatus is a flashlight, and wherein the DC voltage source is a battery within the electronic device.

4. The apparatus of claim 1, wherein the apparatus includes a camera.

5. The apparatus of claim 1, wherein a current amount and a pulse width of the pulses are both varied by the control circuit in order to adjust the first characteristic of light from the light-emitting diode.

6. The apparatus of claim 1, wherein a pulse energy of the pulses is varied by the control circuit in order to adjust the first characteristic of light from the light-emitting diode.

7. The apparatus of claim 1, wherein the control circuit includes a current mirror that changes an amount of current through the light-emitting diode based on a variable amount of control current applied to an input of the current minor.

8. An apparatus comprising:
   a casing;
   a light-emitting diode mounted to the casing;
   a DC voltage source that is mounted to the casing and having an amount of electrical power;
   a user interface that receives input from a user;
   a control circuit, operably coupled to the user interface, the DC voltage source, and the light emitting diode, wherein the control circuit generates a series of pulses to drive the light-emitting diode to adjust a first characteristic of light from the light-emitting diode based at least in part on the received input from the user while maintaining an average intensity of the light from the light-emitting diode as a voltage of the DC voltage source varies; and
   a color detector that generates a feedback signal, wherein the control circuit is operably coupled to the color detector, and wherein the control circuit also controls the color of light from the light-emitting diode by adjusting an amount of current through the light-emitting diode based on the feedback signal.

9. The apparatus of claim 8, wherein the control circuit includes a current mirror that changes the amount of current through the light-emitting diode based on a variable amount of control current applied to an input of the current mirror.

10. An apparatus comprising:
    a casing;
    a light-emitting diode mounted to the casing;
    a DC voltage source that is mounted to the casing and having an amount of electrical power;
    a user interface that receives input from a user; and
    a control circuit, operably coupled to the user interface, the DC voltage source, and the light emitting diode, wherein the control circuit generates a series of pulses to drive the light-emitting diode to adjust a first characteristic of light from the light-emitting diode based at least in part on the received input from the user while maintaining an average intensity of the light from the light-emitting diode as a voltage of the DC voltage source varies and minimize power dissipation by not having a resistor in series with the light-emitting diode and the DC power source, and wherein the control circuit also controls a pulse width of the series of pulses applied to the light-emitting diode based on a measured light output intensity of the light-emitting diode.

11. A method for driving a light-emitting diode in a handheld device having a casing, a DC power source mounted to the casing, and a light-emitting diode mounted to the casing, the method comprising:

receiving input from a user; and based on the received input, generating a series of pulses that drive the light-emitting diode to adjust a first characteristic of light from the light-emitting diode based at least in part on the received input from the user while maintaining an average intensity of the light from the light-emitting diode as a voltage of the DC voltage source varies;

detecting a color of light from the light-emitting diode; and generating a feedback signal based on the detected color of light from the light-emitting diode, wherein the generating of the series of pulses includes controlling the color of light from the light-emitting diode by adjusting an amount of current through the light-emitting diode based on the feedback signal.

12. The method of claim 11, wherein the generating of the series of pulses includes mirroring a current to change the amount of current applied from the pulses through the light-emitting diode based on a variable amount of current controlling the mirroring.

13. A method for driving a light-emitting diode in a handheld device having a casing, a DC power source mounted to the casing, and a light-emitting diode mounted to the casing, the method comprising:

receiving input from a user; and based on the received input, generating a series of pulses that drive the light-emitting diode to adjust a first characteristic of light from the light-emitting diode based at least in part on the received input from the user while maintaining an average intensity of the light from the light-emitting diode as a voltage of the DC voltage source varies, wherein the generating of the series of pulses maintains the average intensity of the light from the light-emitting diode while minimizing power dissipation by not having a resistor in series with the light-emitting diode and the DC power source.

14. The method of claim 13, wherein the generating of the series of pulses that drive the light-emitting diode to adjust the first characteristic of the light from the light-emitting diode that is controlled based at least in part on the received input from the user is the average light intensity, wherein the handheld device is a handheld electronic device, and wherein the DC voltage source is a battery within the electronic device.

15. The method of claim 13, wherein the generating of the series of pulses that drive the light-emitting diode to adjust the first characteristic of the light from the light-emitting diode that is controlled based at least in part on the received input from the user is the average light intensity, wherein the handheld device is a flashlight, and wherein the DC voltage source is a battery within the electronic device.

16. A method for driving a light-emitting diode in a handheld device having a casing, a DC power source mounted to the casing, and a light-emitting diode mounted to the casing, the method comprising:

receiving input from a user; and based on the received input, generating a series of pulses that drive the light-emitting diode to adjust a first characteristic of light from the light-emitting diode based at least in part on the received input from the user while maintaining an average intensity of the light from the light-emitting diode as a voltage of the DC voltage source varies while minimizing power dissipation by not having a resistor in series with the light-emitting diode and the DC power source, wherein the generating of the series of pulses also includes controlling a pulse width of the series of pulses that drive the light-emitting diode based on a measured light output intensity of the light-emitting diode, wherein the first characteristic of the light from the light-emitting diode that is controlled is the average light intensity, and wherein the DC voltage source is a battery within the handheld device.

17. An apparatus comprising:

a casing;

a light-emitting diode mounted to the casing;

a DC voltage source that is mounted to the casing and having an amount of electrical power;

a user interface that receives input from a user;

means for generating a series of pulses that drive the light-emitting diode based on the received input to adjust a first characteristic of light from the light-emitting diode based at least in part on the received input from the user;

means for maintaining an average intensity of the light from the light-emitting diode as a voltage of the DC voltage source varies; and means for detecting a color of light from the light-emitting diode; and means for generating a feedback signal based on the detected color of light from the light-emitting diode, wherein the means for generating of the series of pulses includes means for controlling the color of light from the light-emitting diode using means for adjusting an amount of current through the light-emitting diode based on the feedback signal.

18. The apparatus of claim 17, wherein the means for generating of the series of pulses includes means for mirroring a current to change the amount of current applied from the pulses through the light-emitting diode based on a variable amount of current controlling the means for mirroring.

19. An apparatus comprising:

a casing;

a light-emitting diode mounted to the casing;

a DC voltage source that is mounted to the casing and having an amount of electrical power;

a user interface that receives input from a user;

means for generating a series of pulses that drive the light-emitting diode based on the received input to adjust a first characteristic of light from the light-emitting diode based at least in part on the received input from the user;

means for maintaining an average intensity of the light from the light-emitting diode as a voltage of the DC voltage source varies, wherein the means for generating of the series of pulses maintains the average intensity of the light from the light-emitting diode while minimizing power dissipation by not having a resistor in series with the light-emitting diode and the DC power source.

20. The apparatus of claim 19, wherein the first characteristic of the light from the light-emitting diode that is adjusted based at least in part on the received input from the user is the average light intensity, wherein the apparatus is a handheld electronic device, and wherein the DC voltage source is a battery within the electronic device.

21. The apparatus of claim 19, wherein the first characteristic of the light from the light-emitting diode that is adjusted based at least in part on the received input from the user is the average light intensity, wherein the apparatus is a flashlight, and wherein the DC voltage source is a battery within the electronic device.

22. An apparatus comprising:

a casing;

a light-emitting diode mounted to the casing;

a DC voltage source that is mounted to the casing and having an amount of electrical power;

a user interface that receives input from a user;

means for generating a series of pulses that drive the light-emitting diode based on the received input to adjust a first characteristic of light from the light-emitting diode based at least in part on the received input from the user;

means for maintaining an average intensity of the light from the light-emitting diode as a voltage of the DC voltage source varies while minimizing power dissipation by not having a resistor in series with the light-emitting diode and the DC power source, wherein the generating of the series of pulses also includes controlling a pulse width of the series of pulses that drive the light-emitting diode based on a measured light output intensity of the light-emitting diode, wherein the first characteristic of the light from the light-emitting diode that is controlled is the average light intensity, and wherein the DC voltage source is a battery within the handheld device.

23. A method for driving a light-emitting diode in a device having a casing, a DC power source mounted to the casing, and a light-emitting diode mounted to the casing, the method comprising:

receiving input from a user; and based on the received input, generating a series of pulses that drive the light-emitting diode to adjust a first characteristic of light from the light-emitting diode based at least in part on the received input from the user while maintaining an average intensity of the light from the light-emitting diode as a voltage of the DC voltage source varies, wherein the generating of the series of pulses maintains the average intensity of the light from the light-emitting diode while minimizing power dissipation by not having a resistor in series with the light-emitting diode and the DC power source.

24. The method of claim 23, wherein the first characteristic of the light from the light-emitting diode that is adjusted based at least in part on the received input from the user is a color spectrum.

25. The method of claim 23, wherein the device includes a camera.

* * * * *